United States Patent [19]

Kuo

[11] Patent Number: 5,596,494
[45] Date of Patent: Jan. 21, 1997

[54] METHOD AND APPARATUS FOR ACQUIRING DIGITAL MAPS

[76] Inventor: Shihjong Kuo, 1433 NW. 189th Way #2, Beaverton, Oreg. 97006

[21] Appl. No.: 338,423

[22] Filed: Nov. 14, 1994

[51] Int. Cl.⁶ ................................................ G06F 17/40
[52] U.S. Cl. .................... 364/420; 364/449.1; 348/144
[58] Field of Search ................................ 364/420, 449; 342/357, 457; 348/117, 144–147

[56] References Cited

U.S. PATENT DOCUMENTS

| | | | |
|---|---|---|---|
| 3,500,733 | 3/1970 | Kreuz et al. | 95/12.5 |
| 3,950,097 | 4/1976 | Göpfert et al. | 356/2 |
| 4,020,344 | 4/1977 | Kerschbaum | 250/330 |
| 4,143,400 | 3/1979 | Heckman, Jr. et al. | 358/95 |
| 4,199,869 | 4/1980 | Van Steenwyk | 33/302 |
| 4,313,678 | 2/1982 | Colvocoresses | 356/2 |
| 4,922,254 | 5/1990 | Schuessler et al. | 342/25 |
| 5,019,828 | 5/1991 | Schoolman | 342/457 |
| 5,045,937 | 9/1991 | Myrick | 358/109 |
| 5,101,268 | 3/1992 | Ohba | 358/88 |
| 5,104,217 | 4/1992 | Pleitner et al. | 356/2 |
| 5,140,532 | 8/1992 | Beckwith et al. | 395/101 |
| 5,172,233 | 12/1992 | Yoshihara et al. | 358/222 |
| 5,251,037 | 10/1993 | Busenberg | 358/213.28 |
| 5,267,042 | 11/1993 | Tsuchiya et al. | 358/209 |
| 5,467,271 | 11/1995 | Abel et al. | 364/420 |

OTHER PUBLICATIONS

Manual of Photogrammetry, 4th Ed. 1980, Published by the American Society of Photogrammetry.

Remote Sensing and Image Interpretation, 3rd. Ed. 1994, T. Lillesand, R. Kiefer.

"Aerial Image Databases for Pipeline Rights–of–Way Management", Photogrammetric Engineering and Remote Sensing, vol. 60, No. 3 pp. 347–353, Mar. 1994, M. Jadkowski et al.

*Primary Examiner*—Michael Zanelli
*Attorney, Agent, or Firm*—Pugh Associates; C. Emmett Pugh

[57] ABSTRACT

A method and an apparatus are disclosed that, when used in an airborne environment, acquire spatial imagery, that are instantaneous pictures of one or more terrestrial scenes, and the absolute geophysical coordinates (Latitude and Longitude) of ground objects simultaneously. Any number of series of terrestrial images and the absolute geophysical coordinate information are recorded digitally. The absolute geophysical coordinate information is displayed in real-time. The terrestrial imagery and the absolute geophysical coordinate coordinates are displayed and queried in near real-time. Thus, a new type of digital maps, comprising a two-dimensional terrestrial image and the absolute geophysical coordinates of any terrestrial objects in the image, is obtained using solely digitally-recorded spatial data on an original, unprocessed mission medium, or any secondary media. Near real-time images and accurate longitude and latitude coordinates can be displayed and queried before the aircraft lands.

23 Claims, 19 Drawing Sheets

METHOD AND APPARATUS FOR ACQUIRING DIGITAL MAPS

TECHNICAL FIELD

The present invention relates to photogrammetry, aerial photography, and map generation. More specifically, the present invention relates to a method and apparatus to acquire instantaneous terrestrial images and the absolute geophysical coordinate information for terrestrial objects within the captured images simultaneously and with a high degree of accuracy.

While the present invention is described herein with reference to an illustrative, exemplary embodiment that acquires spatial imagery with two-dimensional, absolute geophysical coordinate information simultaneously, it should be understood that the invention is not limited thereto. Those having ordinary skill in the art and access to the teachings provided herein will recognize that obtaining the vertical geophysical coordinate information, or elevation, from overlapping images is within the scope thereof, and there are many, additional fields in which the present invention would be of significant utility.

BACKGROUND ART

A list of prior patents and publications which may be of interest is provided below:

U.S. Patents

| Pat. No. | Inventor | Issue Date |
| --- | --- | --- |
| 3,500,733 | Kreuz et al | 03/1970 |
| 3,950,097 | Göpfert et al | 04/1976 |
| 4,020,344 | Kerschbaum | 04/1977 |
| 4,143,400 | Heckman, Jr. et al | 03/1979 |
| 4,199,869 | Van Steenwyk | 04/1980 |
| 4,313,678 | Colvocoresses | 02/1982 |
| 4,922,254 | Schuessler et al | 05/1990 |
| 5,019,828 | Schoolmar | 05/1991 |
| 5,101,268 | Ohba | 03/1992 |
| 5,140,532 | Beckwith et al | 08/1992 |
| 5,172,233 | Yoshihara et al | 12/1992 |
| 5,251,037 | Busenberg | 10/1993 |

Publications

*Manual of Photogrammetry*, 4th Ed. 1980, published by the American Society of Photogrammetry

*Remote Sensing and Image Interpretation*, 3rd. Ed. 1994, T. Lillesand, R. Kiefer "Aerial Image Databases for Pipeline Rights-of-Way Management", *Photogrammetric Engineering and Remote Sensing*, Vol. 60, No. 3, pp. 347–353, 1994, M. Jadkowski et al

*Photogrammetric Engineering and Remote Sensing*, p. 347, No. 3, 1994

Presently, map generation involves four stages:

(1) Aerial photography—A series of effort must be exercised to plan an aerial campaign, to navigate flight and acquire data over target area, to develop and pre-process film negatives for input into photogrammetric instruments such as stereo-plotters. U.S. Pat. No. 3,500,733 to Kreuz discloses an apparatus that acquires instantaneous pictures of terrestrial scenes using film negatives as a recording medium. The film images recorded by an aerial camera does not tell the absolute geophysical coordinates, i.e., the latitude and the longitude, of ground objects on the film image directly. Chapter VII of *Manual of Photogrammetry* describes the elements, practices, and cost of planning and execution of aerial photography. Careful planning is always necessary, but it does not eliminate all sources of errors of flight execution. Errors not corrected at the first opportunity will result in greatly increased expenses of time and labor.

(2) Ground support—A number of tasks must be carried out if photogrammetric processing is to be performed. These tasks include the setting up of target patterns under flight paths, collecting horizontal and vertical absolute geophysical coordinates of ground control points. Chapter VIII of *Manual of Photogrammetry* (4th Ed. 1980; American Society of Photogrammetry) describes the field surveys required for photogrammetry.

Field surveys are expensive and time consuming. Frequently, identifiable image features in an aerial image may present difficulty for field surveyors due to different perspectives from an aircraft at altitude versus surveyors on the ground. In addition, satellite visibility imposes constraints in conducting geodetic surveys using a Global Positioning System (GPS) instrument. A visually outstanding feature in an image often is not conducive for positioning the survey equipment for optimum accuracy. This problem is accentuated by the fact that the mission data (i.e. the film negatives) takes several days to develop, that providing all the film images to the ground crew by producing copies of contact prints incurs extra cost, that the film image does not provide any ground coordinates for any of the features on the negatives or prints, that the film medium gets easily damaged in a harsh field environment.

Thus, field surveying usually requires substantially extra effort to collect more field data than that is necessary for optimum efficiency and economy, in order to insure that an adequate number of ground control points are available for photogrammetric processing.

(3) Photogrammetry—In order to derive absolute geophysical coordinate information from aerial films, a pair of diapositives of overlapping aerial photos (or a stereo pair) are processed using aerial triangulation techniques. The aerial triangulation process utilizes the camera parameters, such as the camera's focal length, radial distortion coefficients, and ground-control-point data to determine the exterior orientation of the exposure station of each photograph. The exposure station refers to the point in the three-dimensional geophysical space that is occupied by the camera lens at the moment of exposure. The exterior orientation refers to the three-dimensional coordinates of the exposure station and the attitude parameters, i.e. a roll angle, a pitch angle and a drift angle, of the camera at the instant of taking an exposure.

After the attitude of the camera and altitude is known, geometric correction and rectification are applied to the image to correct for distortion that arises due to lens aberration, the roll angle, the pitch angle, and the drift angles. Registration of image to ground control points is also necessary to correct for other distortion, such as relief displacement, not corrected in previous steps. Then, the absolute geophysical coordinates of any terrestrial features in the aerial photograph can be obtained from the exterior orientation information, the imaging geometry, the height above ground, and projection calculation. U.S. Pat. No.

3,950,097 to Göpfert (issued Apr. 13, 1976) is an apparatus that processes a pair of stereo photo images. This apparatus addresses only the improvement of the stereo-compilation process. The cost of aerial photography, the cost of ground control are not addressed by this apparatus.

(4) Map compilation—After aerial photo images are geo-referenced and rectified, point features, line features, area features can be extracted, projected into desired map projection system, annotated, and output into desired product.

The first three stages of the map generation effort need to be completed before the absolute geophysical coordinates can be obtained from aerially captured terrestrial images. The expense of time and labor to complete these three stages of effort is high both in terms of time duration and dollar amount.

Traditional map data, either in hard copy form or digital form, contains a wealth of symbols and drawings that are geo-referenced such that both natural and cultural features on the map can be queried to obtain its absolute geophysical coordinates. However, due to the cost and the complexity of processing aerial photographs, map data are usually dated on a scale of six months to many years when the final maps are being produced. The spatial data that are represented on a map are only a fraction of the data content in the original image.

An aerial camera does not have near-real-time playback capability to display the imagery that was recently acquired. Traditional aerial photography captures terrestrial imagery on film negatives, which are expensive to procure, maintain, and archive; and the film media occupy significant amount of space and weight, require developing and media transfer before spatial data can be verified during each mission for quality control of flight execution. Further processing for aerial triangulation, image rectification and registration is possible only when preceding steps are executed successfully.

Aerial photography employs a recording mechanism that is analog because the terrestrial imagery is recorded as a continuous tone of varying transmittance of the film negative. In order to make use of the film images, the film negative has to be transferred onto a diapositive for use with analytic stereo-plotters. The diapositive, which is a positive photograph on a transparency, are digitally scanned into a computer-compatible format for use with "soft copy" stereo-plotters or workstations.

Although imagery can be viewed directly with the film negatives once it has been developed, the absolute geophysical coordinate of any terrestrial feature, such as the latitude and longitude of a street corner, can not be obtained from the original recording medium. This increases the delay of useful information for the data user.

Aerial photography, photogrammetric processing require a multitude of expensive, and physically distinct machinery. They include aerial camera, film development and processing equipment, film digitizing equipment, map digitizer, densitometer, stereo-comparator, stereo-plotter, workstation, etc.

Alternative methods of producing maps using spatial image data acquired by different types of sensors and recorded in digital form have been attempted and implemented. Two main approaches exist that attempt to address the high cost and prolonged processing of aerial photography, as summarized below.

(1) Satellite imaging

LandSat and SPOT satellite sensors captures multi-spectral terrestrial imagery from a low earth orbit with ground resolution that is comparable or coarser with respect to human habitation features. Typically, ground support data are not collected, which contribute to the lower cost of using satellite image data for applications that involve large areas or small map scale data. Nevertheless, current satellite imaging data is not suitable for government and private sector users dealing with urban management and development issues working on medium and large scale mapping applications.

Furthermore, the degree of accuracy in absolute geophysical coordinate information for satellite imaging data is poor. The most popular satellite data source is the panchromatic high resolution imagery of the SPOT satellite, yet SPOT panchromatic imagery with a ground sampling distance of ten (10 m) meters is accurate only to within five hundred (500 m) meters in absolute geophysical coordinate accuracy. The ground sampling distance (GSD) is the smallest distance on the ground that a detector element in an airborne or space-borne sensor views at a given instant. Although, satellite sensors capture terrestrial images in digital form, the original form of image data requires several steps of pre-processing before the terrestrial imagery can be delivered to data users.

Satellite sensor data, such as LandSat, SPOT and other similar sensors, possess inherently less geometric fidelity in each image scene than aerial photographic images, due to both the nature of the sensor and the characteristics of the satellite motion during the acquisition of each image scene. In order to obtain acceptable accuracy in the absolute geophysical coordinate information that satisfies users' needs, satellite sensor data need additional processing for registration and rectification. Because no ground control data is provided for satellite imagery, attitude information for the sensor may not be available, utilized, or well defined, registration to existing map features is the most viable method, and a limiting factor on the accuracy of the absolute geophysical coordinate information user can obtain from satellite images.

U.S. Pat. No. 4,313,678 to Colvocoresses (issued Feb. 2, 1982) describes an automated satellite mapping method (MAPSAT) that has the potential to acquire image data with a fifteen (15 m) meter GSD and a positioning accuracy likely to be about seventy-five (75 m) meters. [Assuming there is thirty-five (35 m) meter positioning error on satellite position and a forty (40 m) meter error from attitude control at a nine hundred (900 km) kilometer orbit.] This is comparable to or better than the next generation of the LandSat 7 satellite. The estimated cost of building and launching the LandSat 7 satellite is expected to exceed seven hundred ($7,000,000.00) million dollars.

Higher resolution data impose even more stringent demands on the satellite's positioning and attitude control, and more payload capacity, which will escalate the cost even further. In light of the unpredictable risks in the launching of LandSat 6, acquiring high resolution data below one (1 m) meter GSD is probably not very viable for civilian purposes using a satellite platform. Proposed commercial remote sensing satellites only intends to provide 1 m panchromatic resolution data.

MAPSAT employs two or three linear CCD arrays that maintain a fixed orientation between each pair of the linear array. This, in turn, requires constant adjustments on the satellite's attitude by actively steering the satellite vehicle to change its roll angle and drift angle (or yaw angle).

This frequent steering is in addition to the periodic satellite trajectory adjustments that are necessary for maintaining a stable satellite orbit. The constant fuel consumption of a MAPSAT vehicle is likely to further shorten its expected design life than the typical design life of other traditional satellite sensors (5 years).

MAPSAT is described as allowing near real-time mapping capability, but the image data, the attitude data, the satellite's position data are not processed on-board. Its near-real-time mapping capability refers to the possibility of continuously processing data that are already downloaded from the payload instrument (or mission instrument) at one of the ground processing facility, when a stream of data is played back from a secondary storage device. The absolute geophysical coordinates of any image features, such as the ground coordinates of either end elements of each of the array is not known on-board.

MAPSAT acquires each row of a stereo pair of image data at different times. MAPSAT relies on an extreme stability of the vehicle platform. Thus the MAPSAT method is not suited for a more dynamic airborne platform, where any air turbulence may cause sudden disruptions in the attitude of an aircraft.

Satellite imaging method has the advantage over aerial photography in lower cost of data purchase, as it eliminates the need to collect data for ground control points and eliminates the use of the film media. Nevertheless, satellite imaging data has several shortcomings:

(1a) Coarse resolution—not adequate for urban development and management needs. It is expected that high resolution imagery with ground sampling distance of less than three meter (3 m) are needed for urban development and management applications.

(1b) Inferior absolute geophysical coordinate accuracy—satellite image data requires sophisticated and expensive processing to improve upon the accuracy in absolute geophysical coordinate to meet the users' requirement. The accuracy of the absolute geophysical coordinate information that can be achieved for satellite image data is limited by existing maps which may be outdated.

(1c) The high altitude of satellite orbit limits the positioning accuracy without the use of ground control points or map registration—the low earth orbit of a satellite imaging sensor is typically about eight (800 km) kilometers above earth's surface, an error of five hundredths (0.05) milliradian, or twelve (12) arc seconds, in either the roll angle or the pitch angle will result in errors of the absolute geophysical coordinates on the ground at forty (40 m) meters. For an airborne vehicle that flew at three (3 km) kilometers, the corresponding positioning error due to attitude uncertainty would be only fifteen hundredths (0.15 m) of a meter.

(1d) The absolute geophysical coordinate of any terrestrial feature in a satellite image is not available using the payload data. The payload data recorded on the original mission medium require a large amount of processing before it is ready for distribution. This creates delays for the data users.

(1e) The handling and distribution of satellite image data require a multitude of expensive, and physically distinct machinery. They include satellite data relay, ground receiving station, satellite tracking equipment, telemetry uplink and downlink equipment, raw mission data pre-processing computer network and software, media transfer/duplication equipment, image processing equipment and software etc.

(1f) Satellite sensors do not have simultaneous capabilities of near-real-time playback and spatial querying of absolute geophysical coordinates on ground objects using the payload data.

(1g) Satellite imaging method are affected by both high altitude cloud and lower altitude cloud covers. Because the aperture and the focal length of the optical system of a satellite sensors is fixed, the duration of exposure is fixed with respect to the velocity of the platform, the finite digitizing resolution (6 bit or 8 bit) and partial cloud covers present a more serious impediment for processing satellite imagery, because image quality is strongly affected by image contrast.

(2) Airborne Imaging

Many airborne imaging systems are in operation today. A brief description is discussed in Chapter 2 of *Remote Sensing and Image Interpretation* (3rd Ed., 1994), by Lillesand & Kiefer. There are systems that acquire hyperspectral imagery, multispectral imagery, color imagery and panchromatic imagery. Some of these systems use mechanical scanning technique and aircraft motion to acquire terrestrial imagery, some use linear arrays and aircraft motion to acquire terrestrial imagery (pushbroom sensor), and some use video cameras or frame imaging cameras to capture a snapshot of the terrestrial scene. Many of these systems use digital recording methods to store the image data and even some ancillary data, some systems use analog recording methods.

The shortcomings of the previous airborne imaging methods include:

(2a) Inferior geometric fidelity in image quality for scanning sensors, pushbroom sensors and video cameras—The two-dimensional spatial image captured by these sensors are not acquired at the same instant. Each image scene consists of a two-dimensional grid of discrete cells, each of which is referred to as a pixel. For scanning sensors, the adjacent pixels are acquired at different times. Typically, attitude data are sampled once per scan revolution, instead of being sampled at more frequent intervals. For pushbroom sensors, adjacent rows of pixels are acquired at different times. Video cameras suffer from long exposures of the camera that are limited by the conventional video standard. Also traditional video camera employs a scanner readout circuitry. As a result, different pixels in the image plane are acquired in sequence rather than all at once. Consequently, any changes in the direction of the aircraft's velocity or attitude result in geometric distortions for different regions within the two-dimensional image, or insufficient information is available to obtain accurate records of the sensor's location or its attitude parameters at the appropriate instant. Therefore, these image data requires sophisticated and expensive post-mission processing to improve upon the geometric fidelity and to achieve a positioning accuracy that meet the user's requirement.

(2b) For almost all of the scanning and pushbroom sensor, the absolute geophysical coordinate of terrestrial features in an airborne image is not available for simultaneous display and querying using the original, unprocessed mission data medium (payload data). This creates delays in distributing the data to users. The closest implementation for displaying image and querying the absolute geophysical coordinate of image features is an image display software for a recent multispectral scanner system developed at Stennis Space Center (unpublished work of Shihjong Kuo, the inventor hereof). This software is capable of querying the absolute geophysical coordinates of terrestrial features in coarse accuracy using the original, unprocessed mission data medium, limited by unconnected positioning information in the original, unprocessed mission data.

Like other scanning sensor of this type, this scanner acquires image one pixel at a time, and the attitude parameters are sampled only once per revolution. The attitude changes during each revolution can not be accounted for. The absolute geophysical coordinates obtained by the display software does not correct for the geometric distortions arising from a non-zero roll angle, or a non-zero pitch angle, or a non-zero drift angle.

(2c) The handling and distributing of airborne image data require a multitude of expensive, and physically distinct machinery. They include mission data pre-processing equipment, media transfer/duplication equipment, image processing equipment and software etc.

(2d) Previous airborne frame imaging sensors do not have simultaneous capabilities of near-real-time image playback and spatial querying of any terrestrial features in the imagery using the data acquired from a mission flight. Previous airborne frame imaging sensors have to rely on post-mission processing, such as aerial triangulation techniques in conjunction with collecting ground control points, to obtain the roll angle, the pitch angle, and the drift angle.

Alternatively, registering airborne image to existing maps limits the accuracy of obtaining absolute geophysical coordinate information to that of existing maps. An airborne frame imaging sensor developed at Stennis Space Center (published in Photogrammetric Engineering and Remote Sensing, p. 347, No. 3, 1994) has near-real-time playback capability on its image data, but does not have spatial querying capability in obtaining the absolute geophysical coordinate of ground features.

In all of these systems, the image data acquired during the mission, or the payload data, require transferring from the original mission medium to a working medium. Subsequently, a series of preprocessing of the image data is carried out in a centrally located data processing center before data are distributed to the end users. To obtain the desired level of accuracy on the absolute geophysical coordinates, each user has to perform additional image processing using either aerial triangulation techniques in conjunction with collecting ground control point data or rectification and registration to existing map data.

All of these systems require sophisticated and extensive ground processing and, in many cases, collecting supporting data on ground control points before absolute geophysical coordinates on any feature in the terrestrial imagery can be obtained. No accurate absolute geophysical coordinate information, suitable for medium and large scale mapping applications, of any terrestrial features in an image scene is available on the original mission medium.

Thus, there is a need in the art to reduce all aspects of data acquisition and post-mission processing for deriving absolute position information and map production using up-to-date remotely sensed data. The aspects for cost reduction should include equipment and material cost, mission execution and verification process, reduction of ground support tasks, efficiency and accessibility of deriving accurate position information from remotely sensed images.

GENERAL SUMMARY DISCUSSION OF INVENTION

The need in the art is addressed by the present invention which provides a method and an apparatus to acquire terrestrial imagery and the absolute geophysical coordinates simultaneously, preferably displays the absolute geophysical coordinates of image centers and image boundaries on a console immediately as the image is acquired, and records terrestrial imagery and the absolute geophysical coordinate information in a digital means such that both the images and the absolute geophysical coordinates of terrestrial objects in the images are available on all media, including preferably the original mission medium.

The preferred method of the present invention includes the steps of:

(a) acquiring instantaneous pictures, or snapshots of terrestrial scenes from an airborne vehicle using a frame imaging device, such as a CCD camera, under computer control;

(b) acquiring the absolute geophysical coordinates of the airborne vehicle using a position determination device, such as a GPS unit;

(c) acquiring the attitude information, i.e. the roll angle, the pitch angle, and the drift angles, of the frame imaging device;

(d) acquiring timing information between the position and attitude determination events and the instant of each snapshot;

(e) calculating the absolute geophysical coordinates of the exposure station and calculating the absolute geophysical coordinates on a ground reference plane of any desired image features having corrected the geometric distortions arising from a non-zero roll angle, or a non-zero pitch angle, or a non-zero drift angle;

(f) displaying the absolute geophysical coordinates of the exposure station and terrestrial objects in the captured image;

(g) transferring the image data, the airborne vehicle position information, the attitude information of the frame imaging device, and the timing information into a digital recording device; and (h) retrieving data from a payload medium for displaying images and querying the absolute geophysical coordinates of images features while airborne or as soon as the vehicle lands.

The objects and advantages of the present invention include:

(1) Simultaneously acquiring instantaneous pictures of terrestrial scenes and the absolute geophysical coordinates of any terrestrial objects within the picture, or image.

(2) Instantaneous pictures of terrestrial scenes and ancillary data that provide for the determination of the absolute geophysical coordinates of terrestrial objects within the image are recorded on a digital medium that are compatible to desktop computer use.

(3) The absolute geophysical coordinates of ground objects in an image is calculated such that geometric distortions due to a non-zero roll angle, or a non-zero pitch angle, or a non-zero drift angle, thereby reducing the amount of processing to obtain accurate position information from new image data.

(4) The absolute geophysical coordinates of terrestrial features in an image is displayed during each mission while the images are being taken. The exact ground coordinate of image features such as the four corners of each is known and displayed in real-time, thereby confirming successful acquisition of imagery over a target area in real-time.

(5) Accurate absolute geophysical coordinate information of terrestrial features, approximately about 10 m or better of the true location, suitable for urban development and management needs is obtained using in-flight data without collecting data on ground control points. Therefore, field survey becomes an optional effort, but is still a recommended effort for further improvement of positioning accuracy.

(6) Both spatial image data and the absolute geophysical coordinates of terrestrial features in the images are accessible for display and querying in near real-time using payload data, thereby improving the accessibility of new image and the accurate position information.

(7) Both spatial image data and the absolute geophysical coordinates of terrestrial features can be displayed and queried from the original mission medium, but not limited to the original mission medium, thereby simplify handling and distribution of spatial data and information to broad level of users with desktop computers.

(8) Both displaying and querying capabilities are available on the mission instrument, but not limited to the mission instrument, thereby reducing the cost of performing quality assurance while a mission is in progress, thereby providing easy access to imagery and new tools to field survey efforts.

(9) The cost of acquiring high resolution spatial images of terrestrial features and obtaining high accuracy absolute geophysical coordinate information of terrestrial objects is greatly reduced by eliminating the use of film negatives, film developing, diapositive reproduction, digitizing film scanner, reducing ground control point data collection into optional activities, reducing ground processing activities to determine the exterior orientation of each image exposure and to correct for the distortion due to the roll angle, the pitch angle, and the drift angle.

The above, and other objects, and advantages of the present invention will be apparent in the following detailed description and illustrative drawings.

EXEMPLARY MODE FOR CARRYING OUT THE INVENTION

Figure 5:
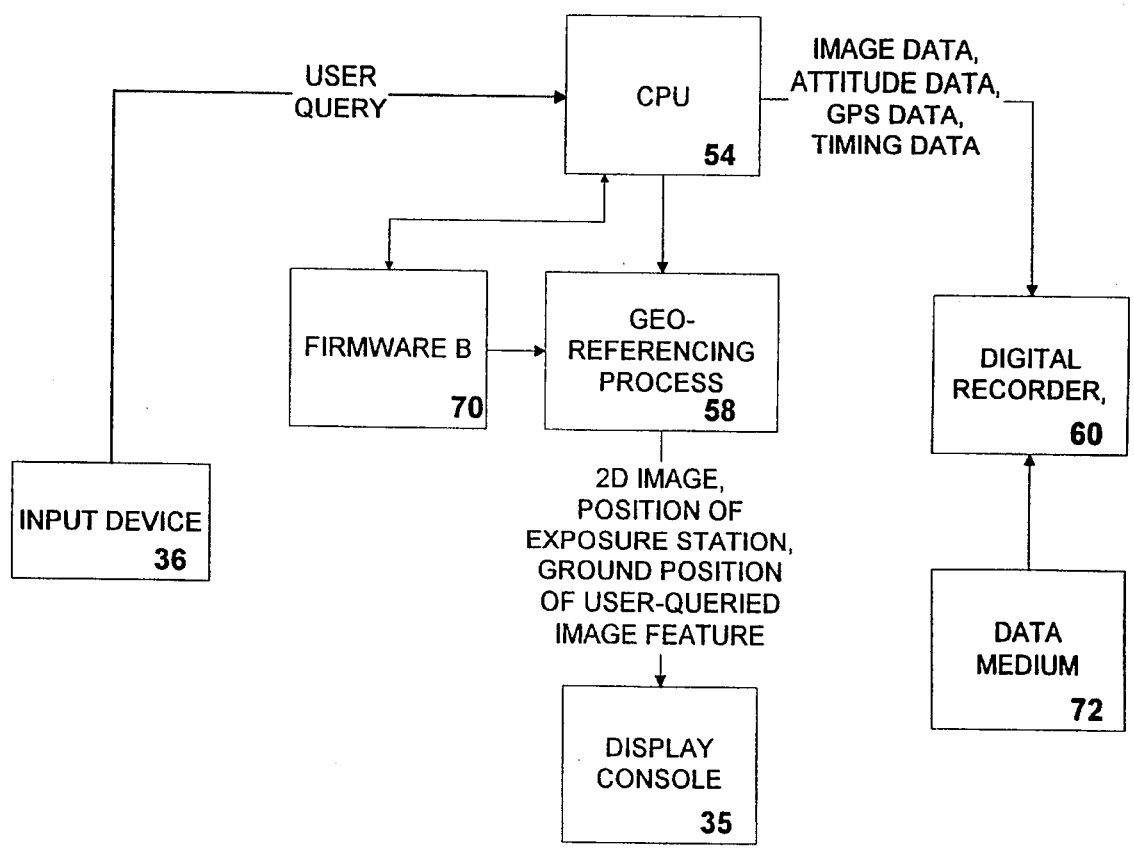
FIG. 5 is a block diagram illustrating a process of displaying and querying the absolute geophysical coordinates of a terrestrial object in an image recorded on a data medium.
Figure 6:
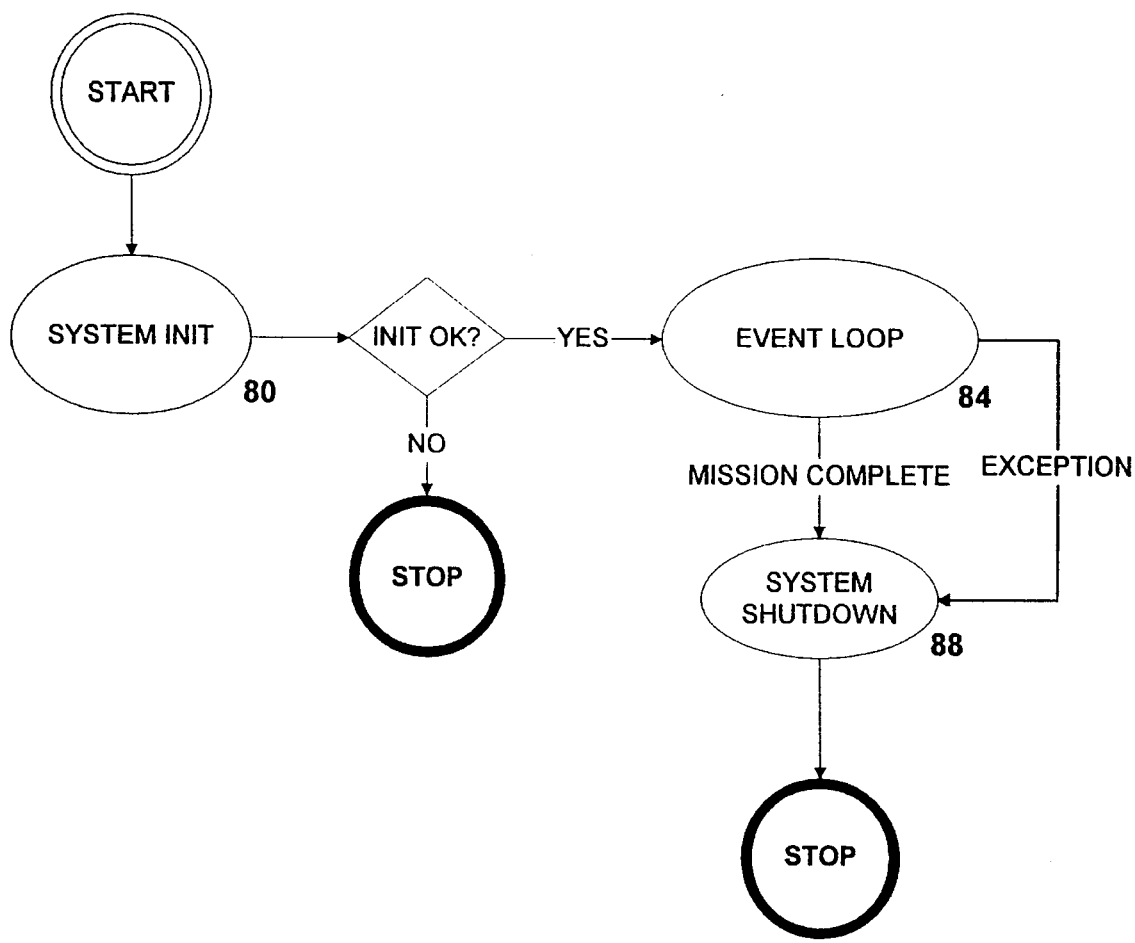
FIG. 6 is a top level, algorithmic flow chart or block diagram showing the structure of a firmware A.
Figure 7:
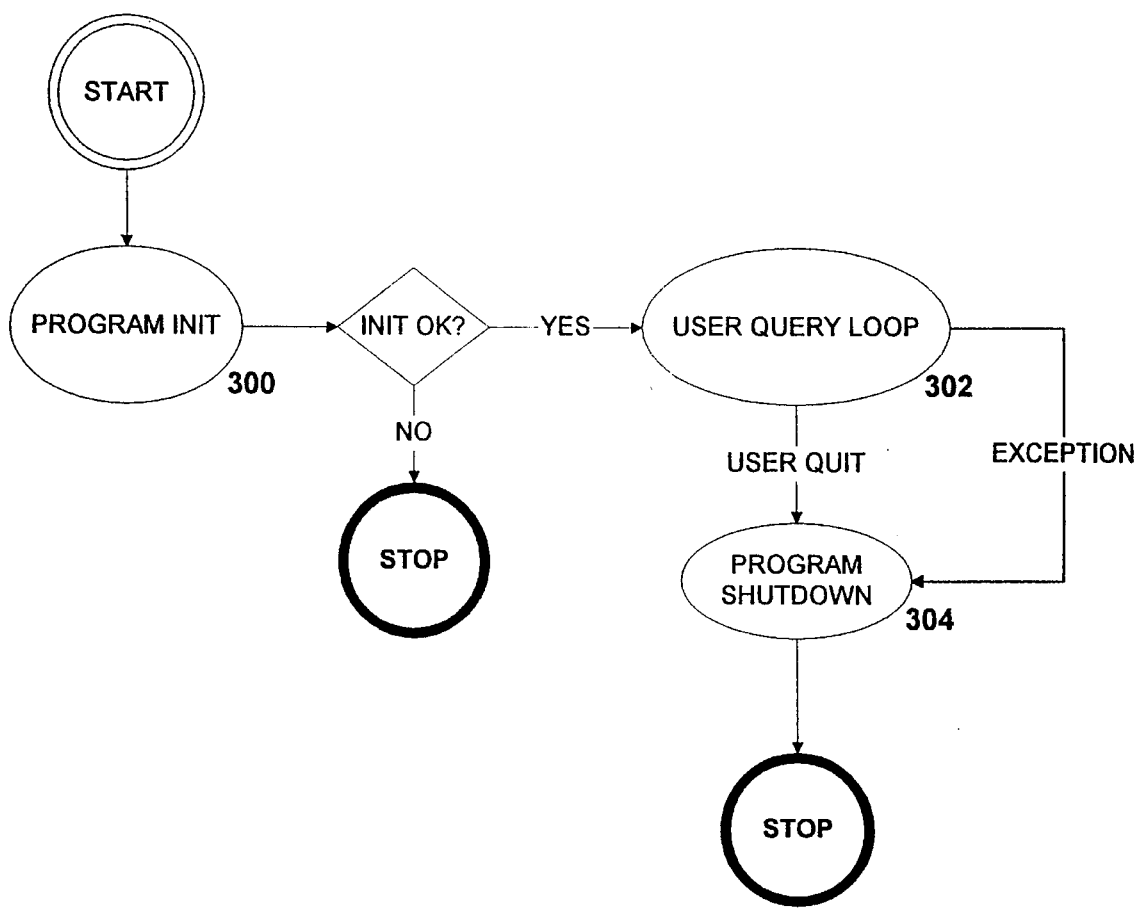
FIG. 7 is a top level, algorithmic flow chart or block diagram showing the structure of a firmware B.

FIGS. 1 through 4 illustrates an exemplary, preferred embodiment of the structure and process used in the present invention for acquiring terrestrial images and absolute geophysical coordinates of image features, in accordance with the principles and approaches of the present invention. FIG. 5 illustrate the preferred embodiment of the process of displaying the terrestrial images and querying the absolute geophysical coordinate of image features in near real-time. FIG. 6 illustrates the top level structure of a firmware that controls the data acquisition mission; while FIG. 7 illustrates the top level structure of a second firmware that displays images stored in a media and queries absolute geophysical coordinate of image features.

Figure 1:
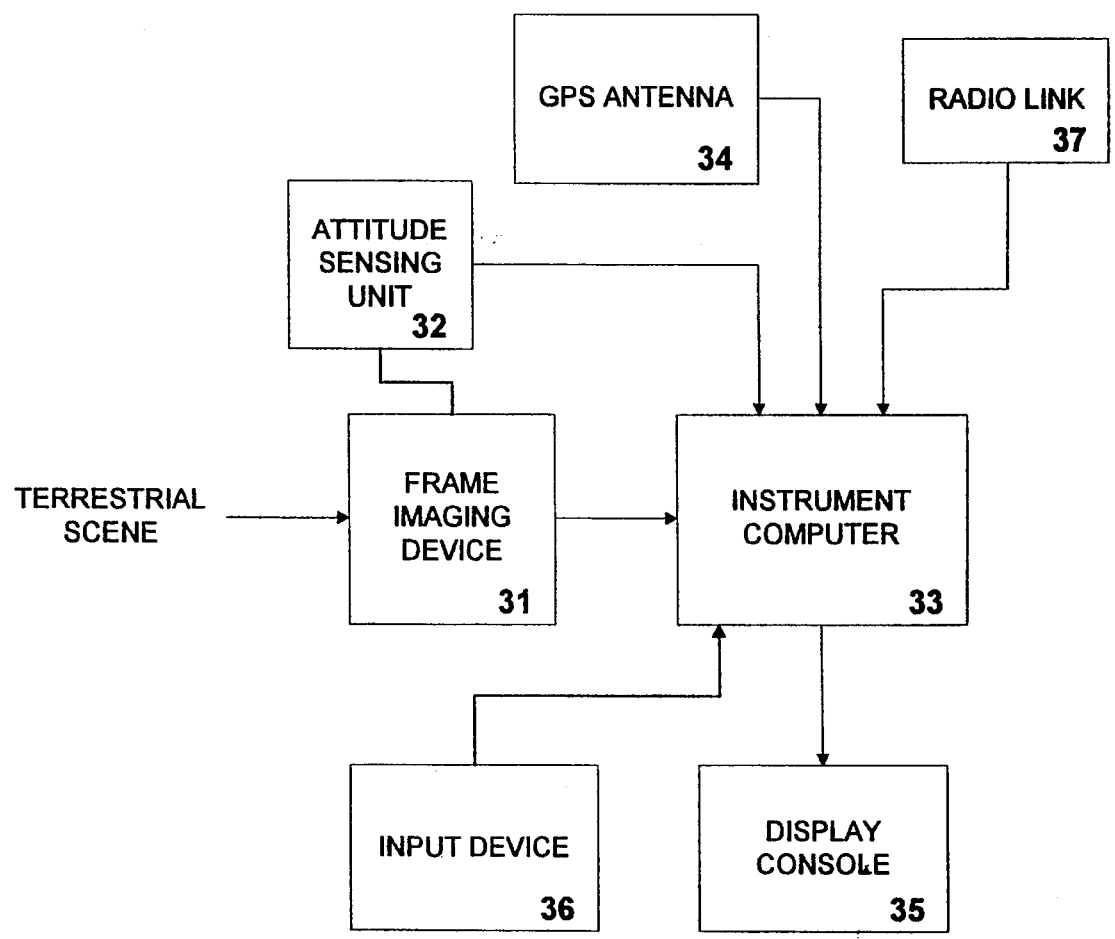
FIG. 1 is a block diagram showing the components of the preferred embodiment of the present invention.

FIG. 1 shows the components of the preferred embodiment, including a frame imaging device 31, such as a CCD camera using a two-dimensional array. The output of the frame imaging device 31 is directed into an instrument computer 33. An attitude sensing unit 32, or a set of angle measuring devices, is attached to the frame imaging device 31, whose output is directed into the instrument computer 33. A positioning device, such as a GPS antenna 34 is attached to an airborne vehicle 236, and the output of the GPS antenna 34 is connected to the instrument computer 33.

A radio link 37, such as an radio frequency modem, is connected to the instrument computer 33. The instrument computer 33 is connected to a display console 35 and an input device 36.

Figure 2A:
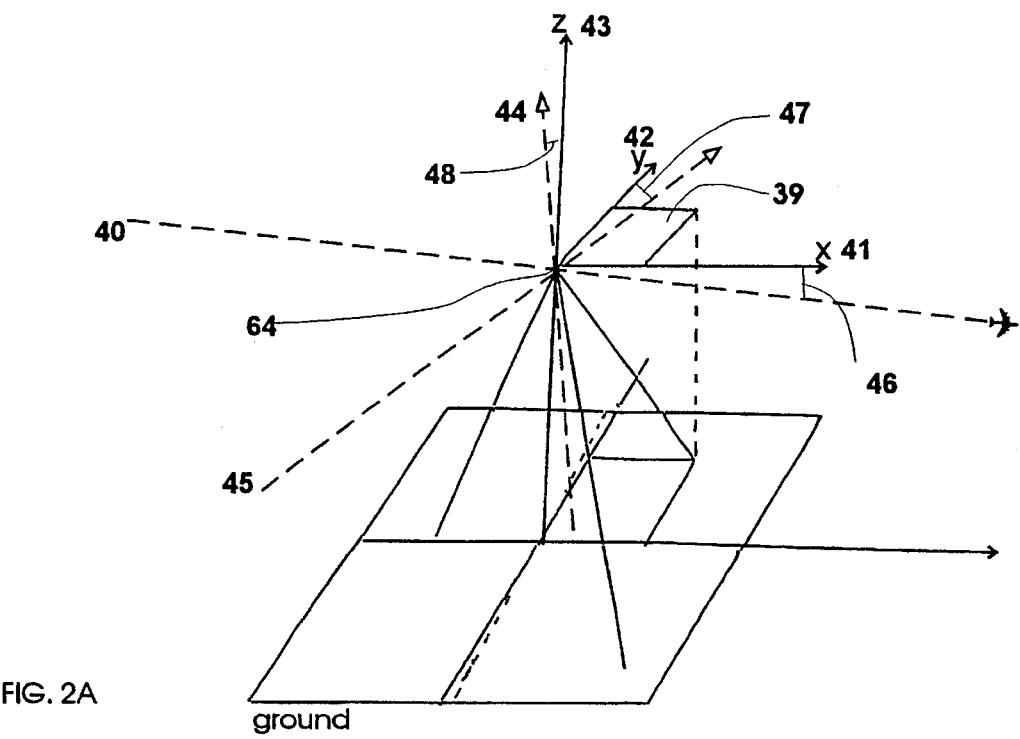
FIG. 2A is a graph illustrating a set of attitude parameters of an image plane of a frame imaging device.
Figure 2B:
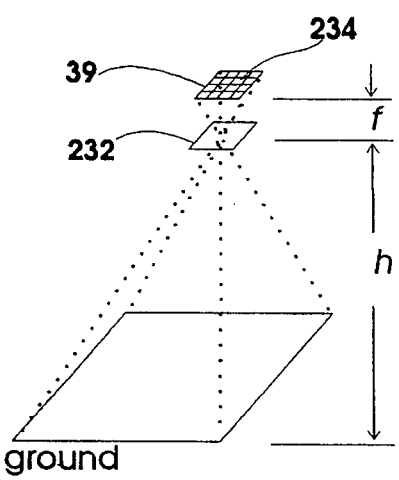
FIG. 2B is a generalized diagram illustrating a vertical imaging geometry between an object plane on the ground and the image plane.
Figure 2C:
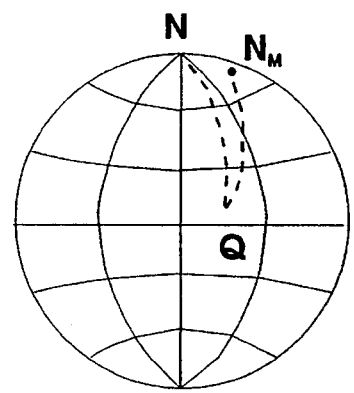
FIG. 2C is a further generalized diagram illustrating a difference between the true North and the magnetic North.
Figure 3:
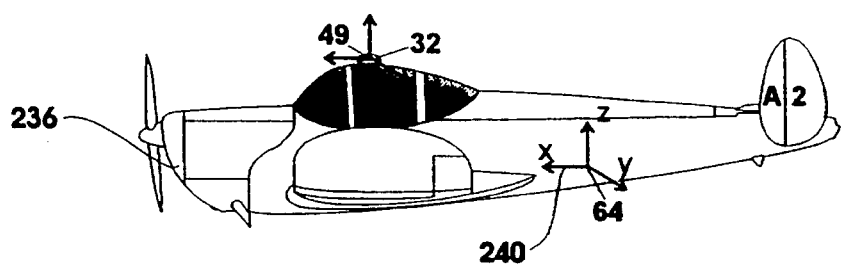
FIG. 3 is a side view of an exemplary airplane illustrating a displacement vector between a GPS antenna phase center and an exposure station.

Referring to FIGS. 2 & 3, the frame imaging device 31 is mounted on the airborne vehicle 236 such that an area of a terrestrial scene is imaged onto a two-dimensional array 234, whose linear axes define a reference plane 39, also referred to as an image plane 39. The attitude sensing unit 32 is attached to the frame imaging device 31. The attitude sensing unit 32 is a set of angle-measuring devices that measure a set of three attitude parameters between an image coordinate system 240 and a set of three world axes.

The image coordinate system 240 consists of a forward axis 41 or "x" axis 41, a "y" axis 42, and a "z" axis 43 of the image plane 39 having a origin located at the center of the two-dimensional array 234. The forward axis 41 of the image plane 39 is the axis parallel to a linear axis of the two-dimensional array 234 of the frame imaging device 31 and in the same general direction of the forward flight motion. The "y" axis 42 of the image plane 39 lies on the image plane 39 and perpendicular to the forward axis 41 of the image plane 39; while the "z" axis 43 of the image plane 39 is the vector perpendicular to the image plane 39.

The set of three world axes include a vertical axis 44, a forward flight axis 40 and a cross-track axis 45. The vertical axis 44 is defined by gravity, the forward flight axis 40 is the vector projection of an instantaneous velocity of the vehicle 236 in the x-y plane of the image coordinate system 240, the cross-track axis 45 is defined by a cross-section between the y-z plane of the image coordinate system 240 and a horizontal plane perpendicular to the vertical axis 44. The three attitude parameters are a roll angle 47 ($\omega$), a pitch angle 48 ($\phi$), and a drift angle 46 ($\kappa$).

The pitch angle 48 is the angle between the forward axis 41 of the image plane 39 and a horizontal axis perpendicular to the vertical axis 44 and lies in the x-z plane of the image coordinate system 240. The roll angle 47 is the angle between the y axis 42 of the image plane 39 and the cross-track axis 45; while the drift angle 46 is the angle between the forward axis 41 of the image plane 39 and the forward flight axis 40.

The image coordinate system 240 consisting of the forward axis 41, i.e. the "x" axis, the "y" axis 42, and the "z" axis 43, constitutes a Cartesian coordinate system that coincides with a set of three body axes of the frame imaging device 31. The origin of the image coordinate system 240 is referred to as an exposure station 64 of an image acquired by the frame imaging device 31.

Referring to FIG. 2B, the image plane 39 is located by a distance equal to the focal length "f" from a principal plane 232 of the optic system. The normal vector of the principal plane 232 is orientated parallel to the vertical axis 44. This geometry produces an image which is referred in the literatures of aerial photography as a vertical photograph. The focal length "f" and an altitude "h", which is the distance between the principal plane of the optic system and a ground reference plane, determines an image scale M=h/f of a vertical image. In a non-vertical photograph, the image scale is non-uniform and anisotropic across the imaging plane 39.

Figure 4:
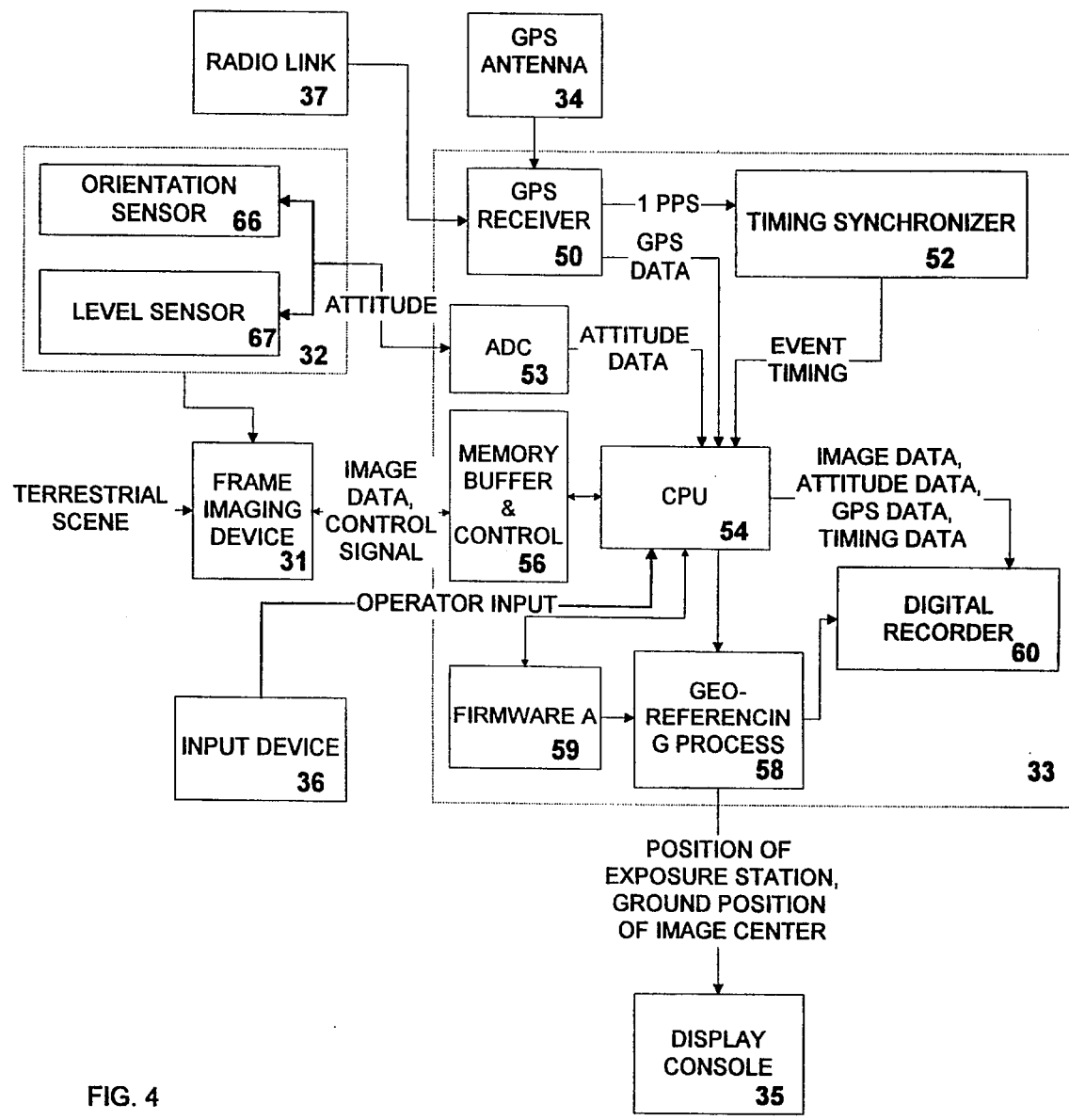
FIG. 4 is a block diagram showing the components of an instrument computer.

Referring to FIGS. 3 & 4, the instrument computer 33 consists of a GPS receiver 50, a timing synchronizer 52, an analog-to-digital converter (ADC) interface 53, a central processing unit (CPU) 54, a memory buffer and camera control 56, a geo-referencing process 58, a firmware A 59, and a digital recorder 60. The digital recorder 60 includes an appropriate storage medium, such as, for example, a rigid disk, an optical disk or a tape storage device.

The GPS antenna 34 is connected to a GPS receiver 50, which is an internal part of the instrument computer 33 in the form of a conventional expansion card. The GPS receiver 50 periodically generates a set of geophysical coordinate and velocity data of a point 49, which is the phase center of the GPS antenna 34. The set of geophysical coordinate data, or position data, and velocity data of the phase center 49 are directed to the CPU of the instrument computer 33. A displacement vector between the phase center 49 and the exposure station 64 is measured once and stored in the firmware A 59.

The GPS receiver 50 is connected to the radio link 37, which receives messages of rotor correction. The GPS receiver 50 also generates a electrical signal at precisely once every second on the second following a Universal Coordinated Time (UCT) standard, which is referred to as one (1) pulse per second, or "1 PPS". The "1 PPS" signal is directed to the timing synchronizer 52 which is a part of the instrument computer 33 in the form of, for example, a conventional expansion card.

The attitude sensing unit 32 consists of an orientation sensor 66, and a level sensor 67. The orientation sensor 66 and level sensor 67 connect to the ADC interface 53, which is an internal part of the instrument computer 33 in the form of a conventional expansion card. The attitude sensing unit 32 and the ADC interface 53 provide a set of attitude data that is used to obtain the roll angle, the pitch angle, and the drift angle.

The memory buffer and camera control 56 directs the operation of the frame imaging device 31 and the flow of a stream of image data captured by the frame imaging device 31. The CPU 54 and firmware A 59 controls the operation of the memory buffer and camera control 56.

The position data and velocity data from the GPS receiver 50 is directed into the CPU 54. The tinning synchronizer 52 generates a UCT time mark data when the CPU 54 sends a timing query through its internal connection.

The CPU 54 accesses and executes the firmware A 59 and the geo-referencing process 58. All data collected from the frame imaging device 31, the attitude sensing unit 32, the GPS receiver 50, and the timing synchronizer 52 are recorded into an appropriate medium in the digital recorder 60.

The geo-referencing process 58 calculates the absolute geophysical coordinate of each exposure station, the absolute geophysical coordinate of one or more image features, such as the center and four corners of each image. The results of these calculations are sent to the display console 35 and the digital recorder 60.

The digital recorder 60 receives the image data, the attitude data, the GPS data, the time mark data from the CPU 54. The digital recorder 60 also receives processed geo-referenced data from the geo-referencing process 58.

The display console 35 is a cathode ray tube device that displays text information and two dimensional pictures of images. The two dimensional picture is an array of discrete pixels which is referenced using a pair of indices that represents a column number and a row number within the two dimensional array. The input device consists of either a keyboard or a pointing device.

Referring to FIG. 5, a data medium 72 reside in the digital recorder 60. Data recorded on the data medium 72 is retrieved by the CPU 54, which accesses and executes the instructions of a firmware B 70. The geo-referencing process 58 and the firmware B 70 enable a picture of a two-dimensional image, the absolute geophysical coordinates of image features to be painted and updated on the display console 35, allows a user to query interactively the absolute geophysical coordinates of image features using the input device 36.

Referring to FIG. 6, the structure of the firmware A 59 includes: a system init module 80, an event loop module 84, and a system shutdown module 88. Referring to FIG. 7 the structure of the firmware B 70 includes: a program init module 300, a user query loop module 302, and a program shutdown module 304. The operation and data flow of these modules are described next in the operation of the invention.

OPERATION OF THE INVENTION—FIGS. 1–17

Referring to FIGS. 1 and 2A, the frame imaging device 31 takes an instantaneous picture of a terrestrial scene. This is accomplished by opening a shutter inside the frame imaging device 31 for a brief period, or an exposure.

The target scene is projected through an optical system onto the image plane 39, where a two dimensional matrix array of a detector is located. Each element of the detector of the two dimensional matrix array is referred to as a pixel. The signal generated at each detector element, which is proportional to the amount of energy reflected from an area of the earth's surface of a linear dimension of a ground sampling distance viewed by one detector element during the period of exposure, is transferred sequentially to the memory buffer and camera control 56 of the instrument computer 33.

Referring to FIGS. 1, 2A & 4, the orientation sensor 66 and the level sensor 67 of the attitude sensing, unit 32 produce electrical signals that are sampled by the ADC interface 53. The level sensor produces two voltage signals whose amplitudes are proportional to the roll angle 47 and the pitch angle 48.

Referring to FIGS. 2A, 2C, and 4, the orientation sensor 66 uses a flux gate compass to measure the a magnetic heading of the forward axis 41 of the image plane 39. The drift angle 46 is obtained by compensating a difference between the magnetic North and the true North. Referring to FIG. 2C, a true heading is indicated by a great circle along a point N, the North pole, and a point Q of observation. The magnetic heading is indicated by a great circle along the point Q and the magnetic pole $N_M$.

Referring to FIG. 4, the ADC interface 53, under the control of the CPU 54, and the firmware A 59, digitizes the output of the attitude sensing unit 32 and attaches a UCT time mark for each measurement using the timing synchronizer 52.

The GPS receiver 50 produces the absolute geophysical coordinates and velocity of the phase center 49 of the GPS antenna 34 at regular intervals. The radio link 37 connected to the GPS receiver 50 provides correction of errors in absolute geophysical coordinate determination that are inherent in the satellite broadcast signals of the GPS system. The UCT time mark for each position fix and velocity fix are also provided by the GPS receiver 50.

The timing synchronizer 52 contains a circuitry to receive the 1 PPS pulse from the GPS receiver 50, and interfaces to the CPU and the firmware A 59 to provide UCT time mark services for a number of system events. The system events include:

(a) the periodic sampling of the signal outputs of the orientation sensor 66 and the level sensor 67, (b) the occurrence of each exposure of the frame imaging device 31, and (c) other internal operations of the instrument computer, such as marking the time of start and finish of input/output operations.

FIRMWARE A 59

The firmware A 59 provides overall supervision and arbitration of data flow from the system hardware. The firmware A 59 also interprets inputs from a user through the input device 36 to effect the proper operation to acquire one or more terrestrial images.

SYSTEM "INIT" MODULE

Figure 8:
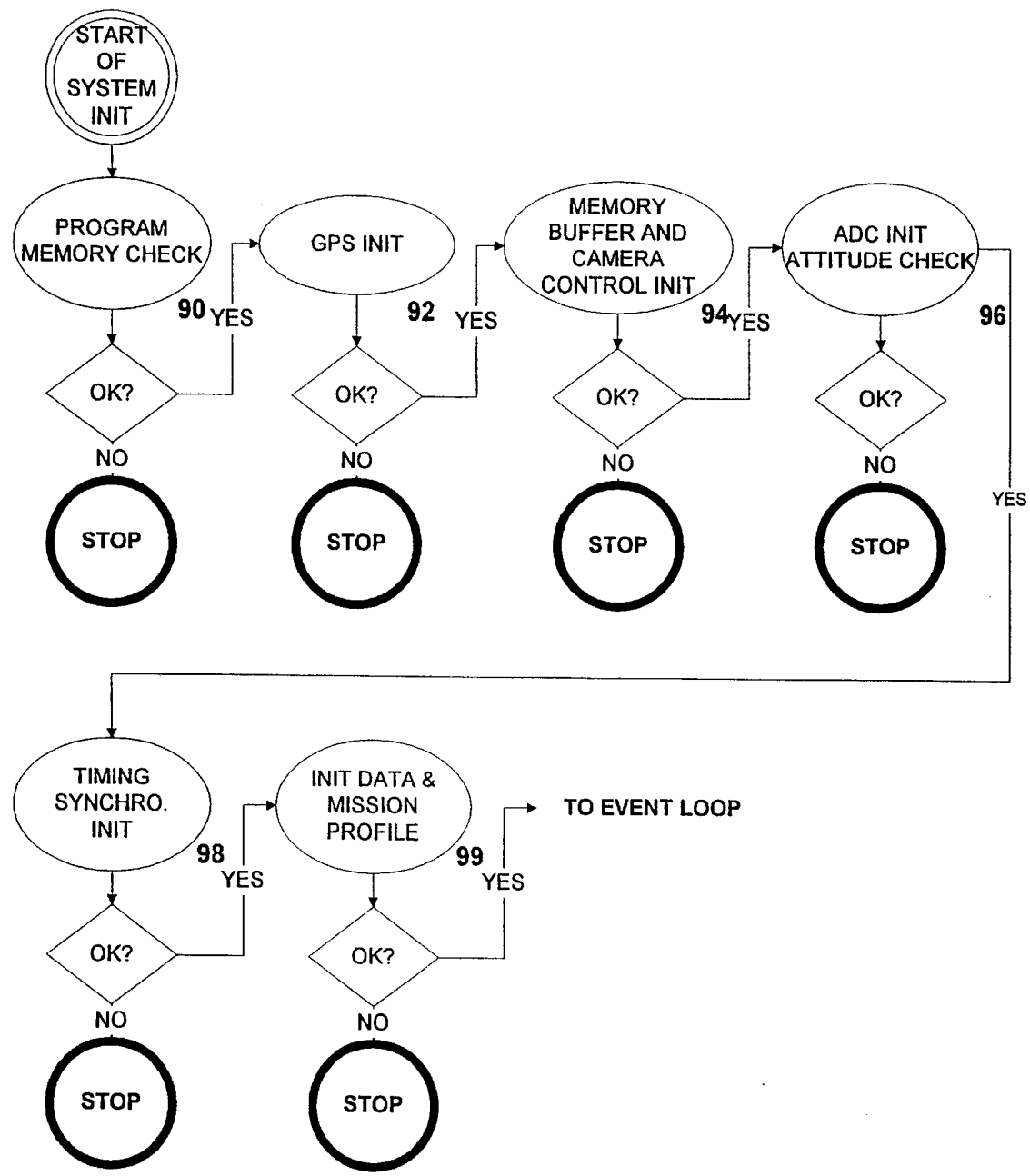
FIG. 8 is an algorithmic flow chart or schematic diagram showing the structure of a system "init" module of the firmware A.

Referring to FIG. 8, the system init module 80 consists of a number of processes that include a check program memory module 90, a GPS init module 92, a memory buffer and camera control init module 94, an ADC interface init and attitude check module 96, a timing synchronizer init module 98, and an init data and mission parameters module 99. These steps ensure that the hardware are ready and functional for operation.

EVENT LOOP MODULE

Figure 9:
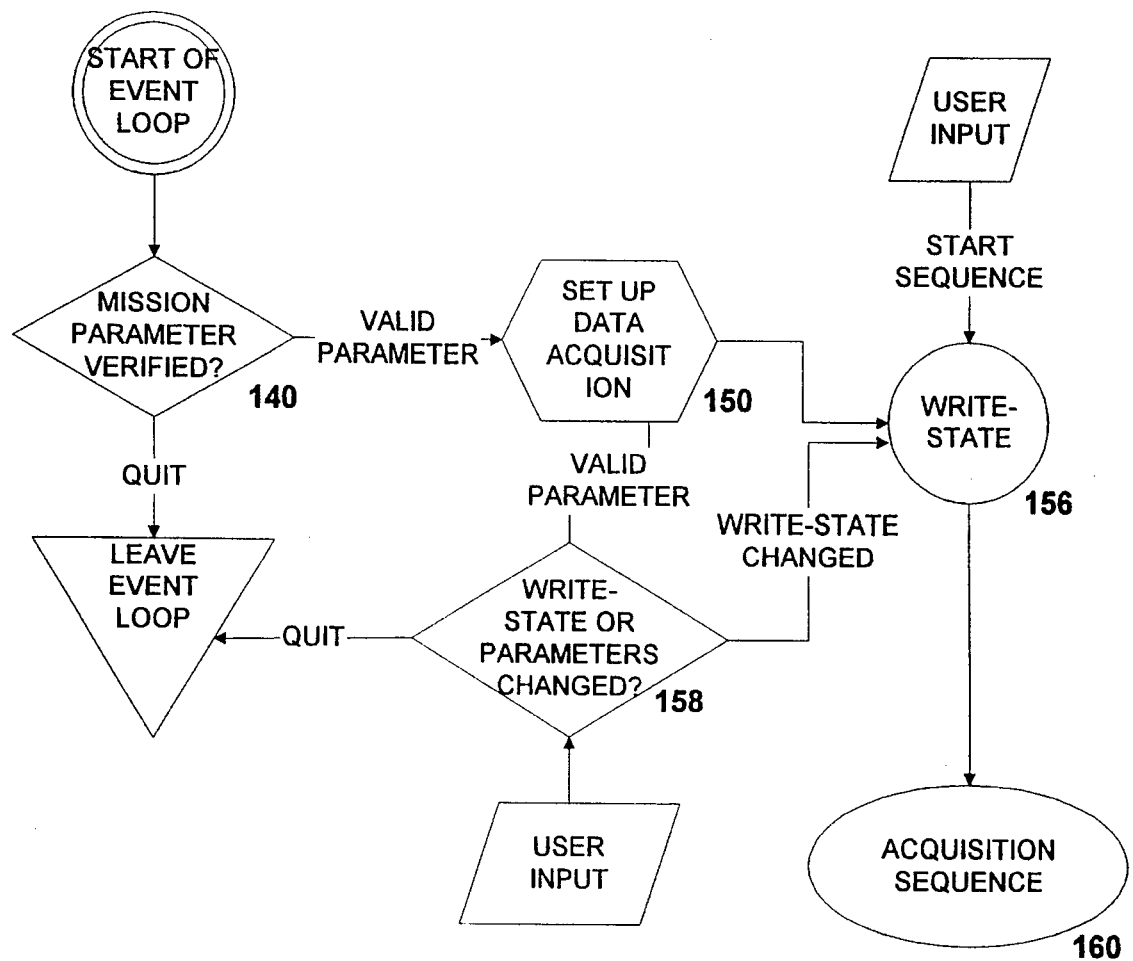
FIG. 9 is an algorithmic flow chart or schematic diagram showing the structure of an event loop of the firmware A.

Referring to FIG. 9, the event loop 84 begins with verification of a set of mission parameters 140. If the mission parameters are valid, then a process 150 of setting up a set of parameters for an execution loop of a data acquisition sequence 160 is in order. The data acquisition sequence 160 then commences.

A write-state variable 156 governs the internal steps of the data acquisition sequence 160. A polling process 158 determines that if an exception has occurred, that if the user had caused changes in the write-state variable 156, the data acquisition parameters, or initiated termination of the data acquisition sequence 160.

Figure 10:
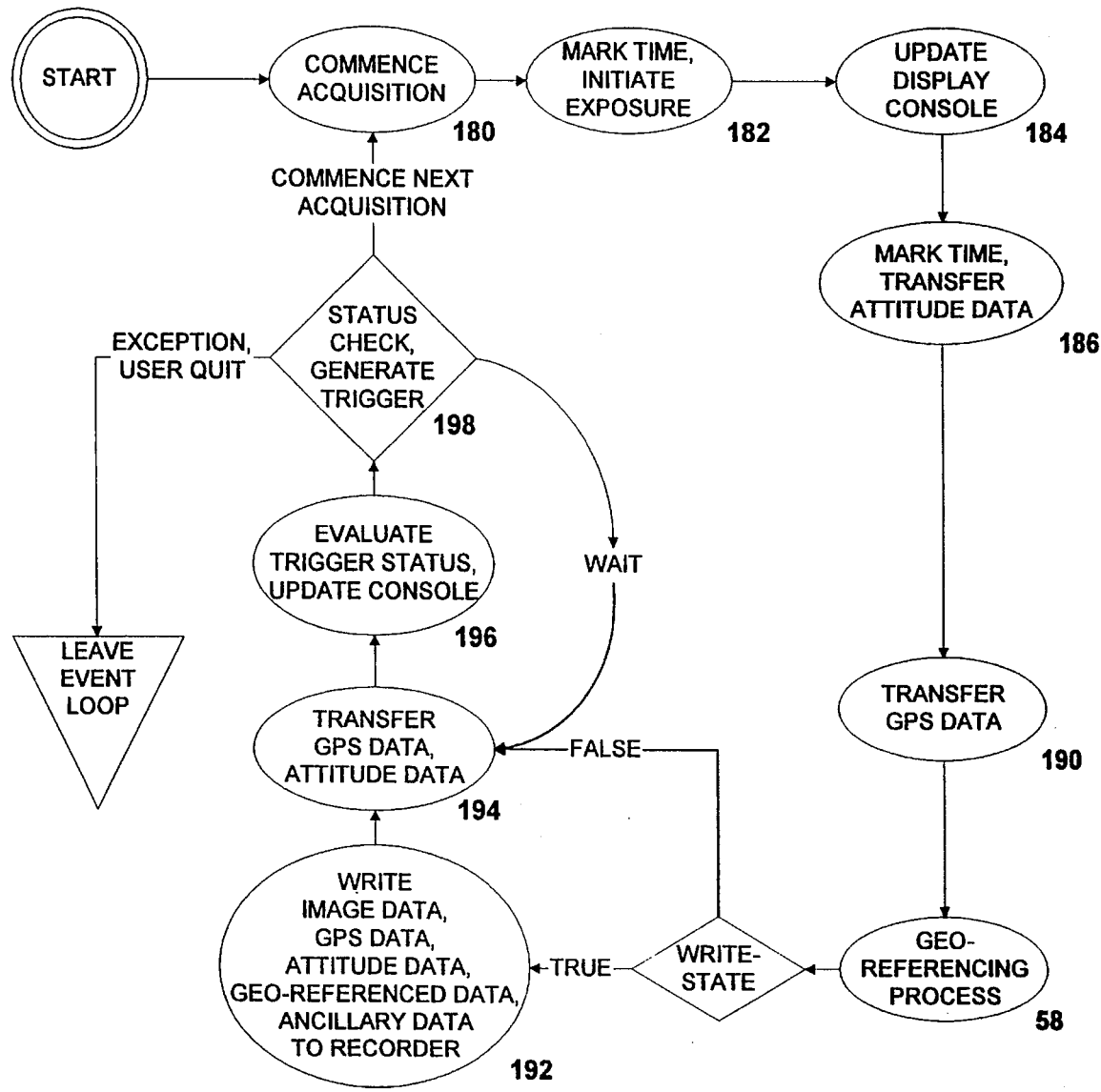
FIG. 10 is an algorithmic flow chart or schematic diagram showing the structure of an acquisition sequence in the event loop.

Referring to FIG. 10, the data acquisition sequence 160 is a loop process in which one or more exposures are initiated. After the target scene is captured, then image data, the attitude data, the GPS data, the timing data, and a set of ancillary data are acquired, processed and recorded. The write-state variable 156 determines whether data is written to the digital recorder 60.

The loop of the data acquisition sequence 160 includes the following steps— an acquisition step 182, which acquires a time mark and initiates an exposure of the frame imaging device 31 by sending a trigger to the memory buffer and camera control 56;

an acquisition step 184, which updates the acquisition parameters to the display console;

an acquisition step 186, which acquires a time mark and transfers the current attitude data from the ADC interface 53;

an acquisition step 190, which acquires the most recent GPS data from the GPS receiver 50;

the geo-referencing process 58, which performs a set of geo-referencing calculation to obtain the absolute geophysical coordinates of the exposure station 64, a set of image features such as the four corners and the center of the acquired image;

an acquisition step 192, which writes all data to the digital recorder 60 if the write-state variable is a logic true; an acquisition step 194, which acquires additional GPS data and attitude data;

an acquisition step 196, which evaluates triggering condition and updates the display console; and an acquisition step 198, which determines exception status, generates a trigger signal to proceed to commence the next data acquisition event, or loops back to acquire additional GPS data and attitude data. The geo-referencing process 58 and the evaluation of the triggering condition are described next.

Figure 13A:
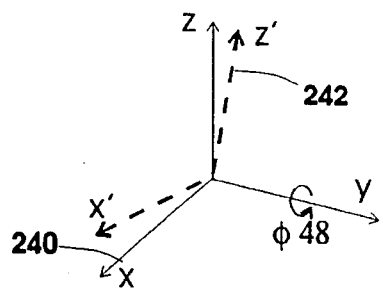
FIG. 13A is a graphical diagram illustrating a rotation around a y axis of the image plane.
Figure 13B:
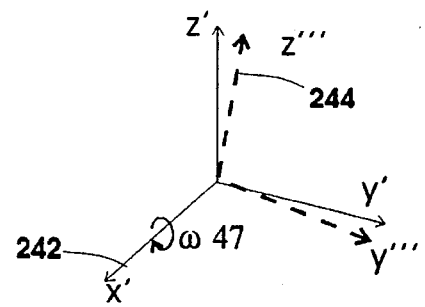
FIG. 13B is a graphical diagram illustrating a rotation around a forward axis (x' axis) of a new coordinate system.
Figure 13C:
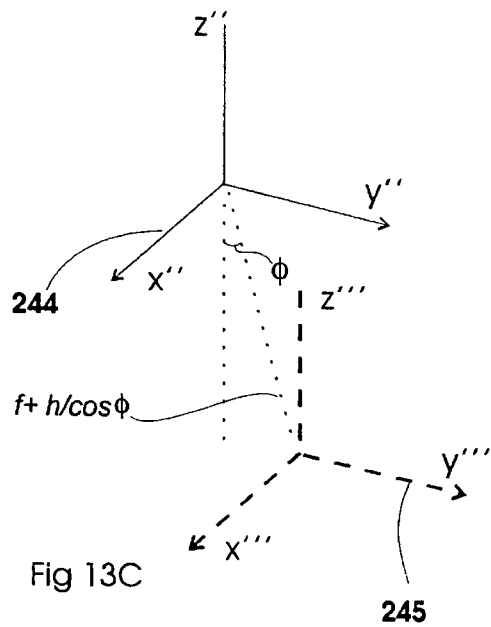
FIG. 13C is a graphical diagram illustrating a translation from the exposure station to a point on a ground reference plane.
Figure 13D:
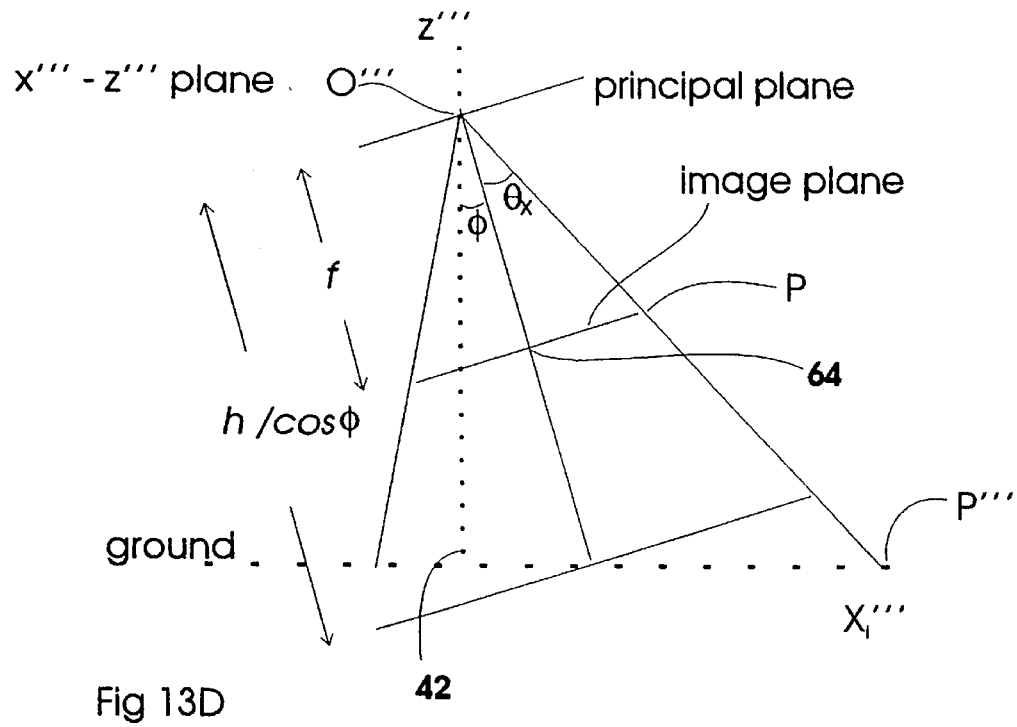
FIG. 13D is a graphical diagram illustrating a non-vertical imaging geometry that affects an anisotropic, non-uniform image scale at an angle $\phi+\theta_x$ from a vertical axis.
Figure 13E:
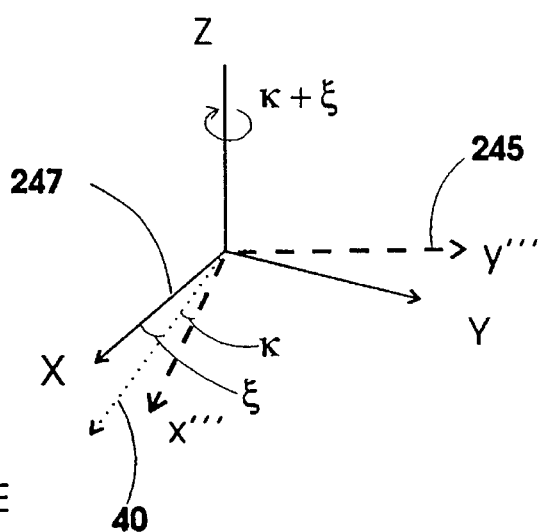
FIG. 13E is a graphical diagram illustrating a rotation around the vertical axis to obtain the absolute geophysical coordinates in an East-North-Up coordinate system.
Figure 14:
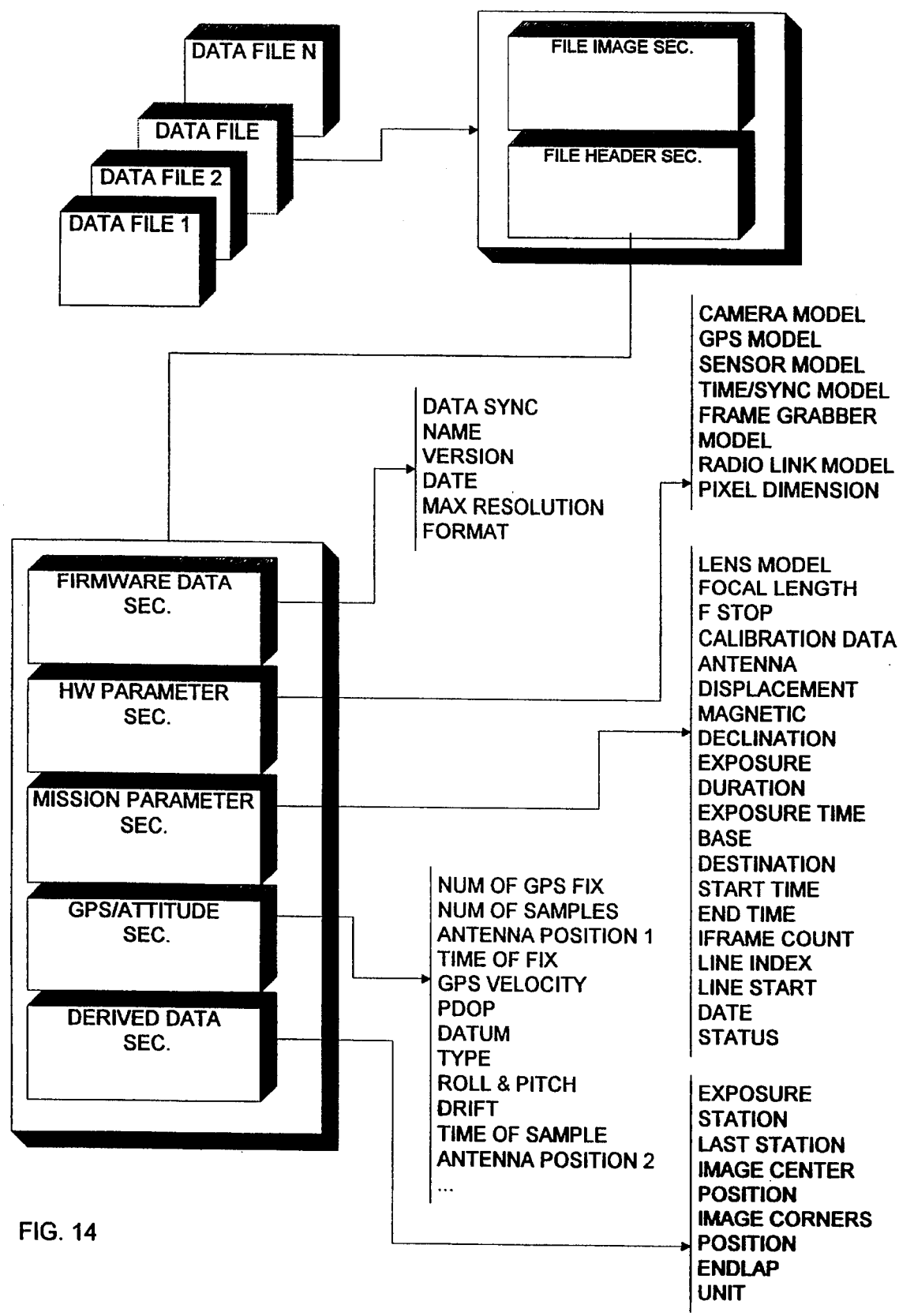
FIG. 14 is a diagrammatic illustration showing the arrangement of a recorded data set of a data acquisition sequence.

Referring to FIGS. 2, 3, 11A, 11B, 11C & 12, the geo-referencing process includes two parts:

(a) determining the absolute geophysical coordinates of the exposure station 64 and the roll angle 47, the pitch angle 48, and the drift angle 46 of the image plane 39, as shown in FIGS. 3, 4, 11A, 11B & 11C; and (b) performing a series of transformations, including a number of rotations, a translation and a scaling to obtain the absolute geophysical coordinates of the terrestrial objects in an image using the absolute geophysical coordinates of the exposure station 64, the altitude above ground, and the roll angle 47, the pitch angle 48, and the drift angle 46 of the image plane 39, as shown in FIGS. 13 and 14.

Figure 11A:
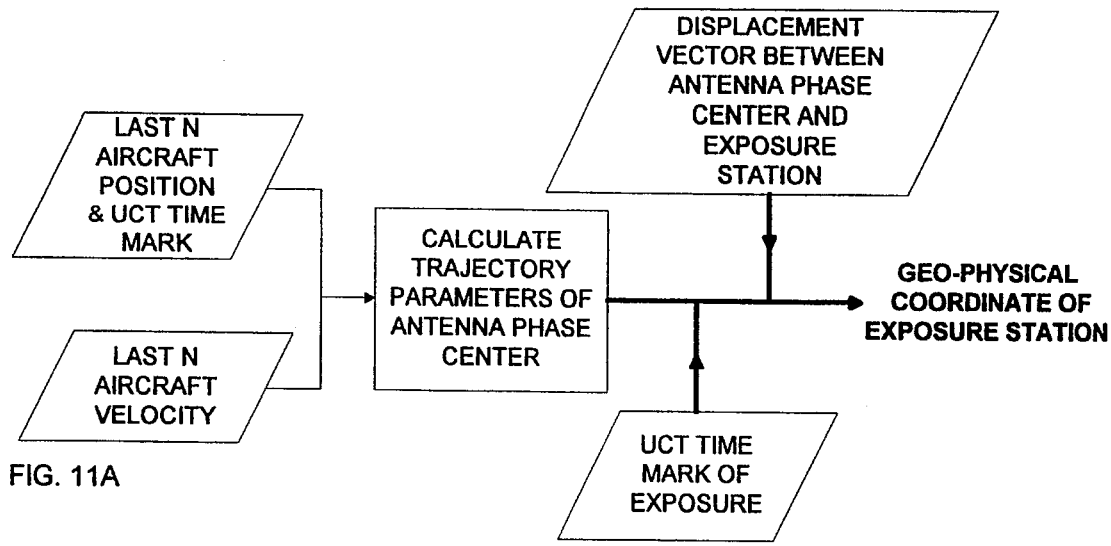
FIGS. 11A through 11C are block diagrams showing a calculation of a set of three dimensional absolute geophysical coordinates of the exposure station, a drift angle, and a roll, pitch and drift angles of the image plane at the instant of exposure, respectively.

Referring to FIG. 11A, a trajectory of the phase center 49 of the GPS antenna 34 is determined from a set of "N" pairs of longitude and latitude coordinates of the most recent GPS data using a conventional polynomial curve fitting method. Each pair of GPS coordinate is associated with a UCT time mark. The number "N" may be "2" or greater. The absolute geophysical coordinates of the phase center 49 at the time of exposure is calculated by a conventional interpolation using the polynomial trajectory of the phase center 49 and the time difference between the instant of exposure and the instant of GPS position determination. If "N" is equal to one (N=1), then the absolute geophysical coordinate of the phase center 49 at the time of exposure is calculated by conventional extrapolation using the most recent phase center position, the most recent GPS velocity heading, and the time difference between the instant of the GPS positioning determination event and the instant of exposure.

Referring to FIGS. 3 and 11A, the absolute geophysical coordinates of the exposure station 64 is determined from the coordinate of the phase center 49, and the displacement vector between the phase center 49 and the exposure station 64.

Figure 11B:
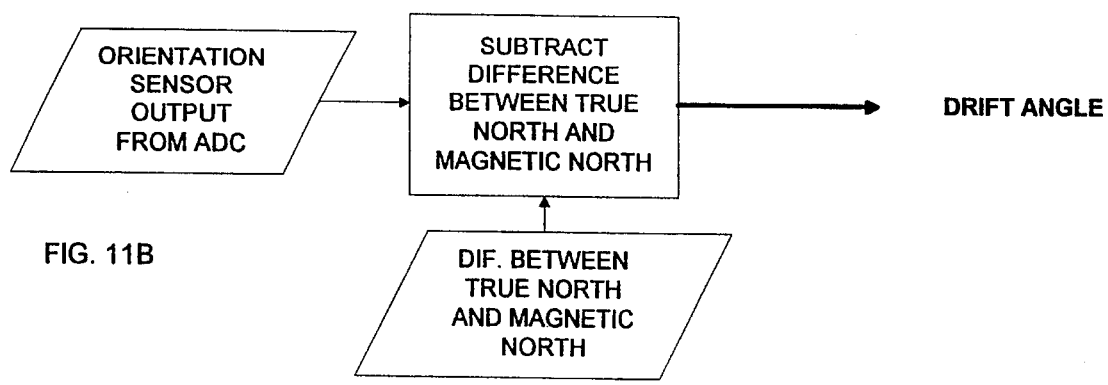

Referring to FIGS. 4 and 11B, the roll angle is obtained by converting the output of the orientation sensor to radians and subtracting the angular difference between the true North and the magnetic North of the earth. A UCT time mark is associated with each set of the drift angle 46, the roll angle 47, and the pitch angle 48, a set of "N" triplets of these variables are fitted using conventional polynomial curve fitting technique.

Figure 11C:
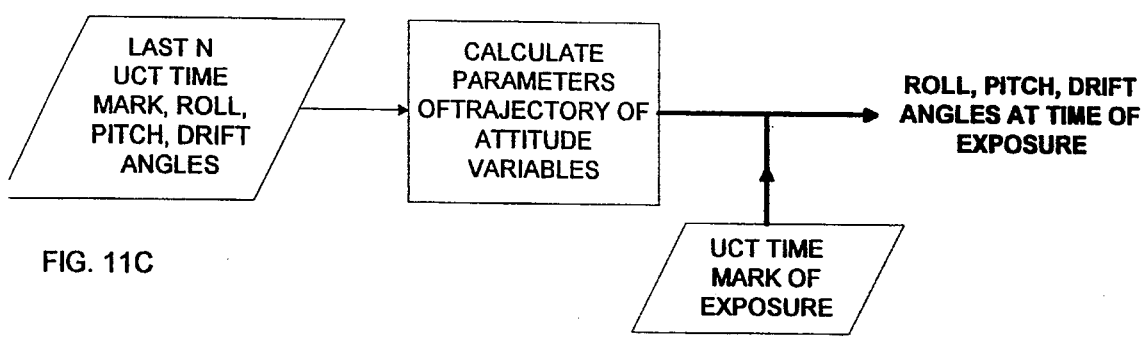

Referring to FIG. 11C, the drift angle 46, the roll angle 47, and the pitch angle 48 of the image plane 39 at the instant of exposure are calculated by conventional extrapolation from the polynomial trajectories of each of the attitude parameters.

Figure 12:
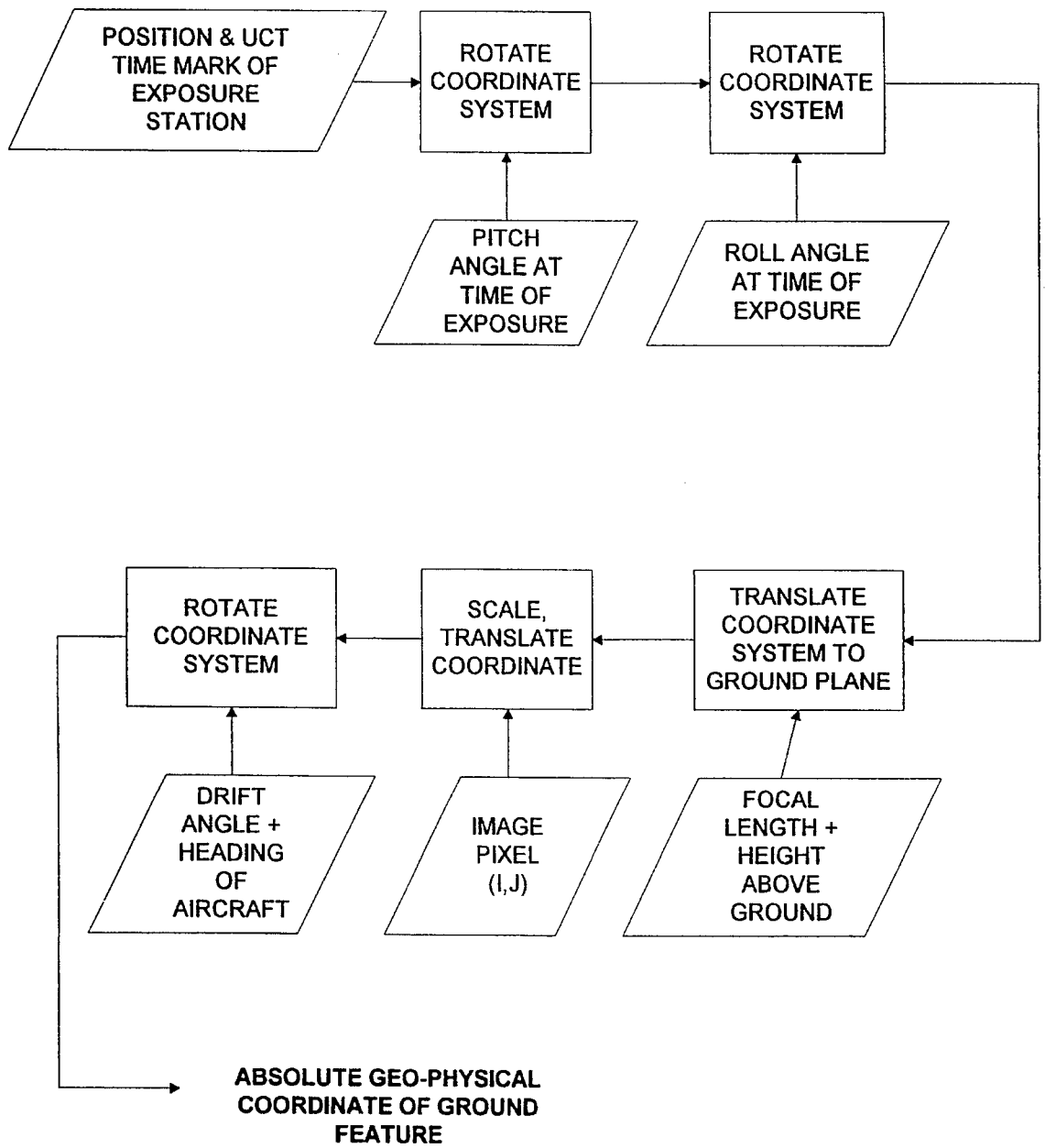
FIG. 12 is a flow, block diagram of a geo-referencing process using a set of position and attitude data to obtain the absolute geophysical coordinates of an image pixel.

Referring to FIGS. 12 & 13, the procedures to calculate the absolute geophysical coordinate on a reference plane on the ground for an image pixel in column i and row j of the detector array starts with an image space coordinate system 240, whose origin is located at the exposure station 64. If the optical system associated with the frame imaging device 31 is aberration-free, then the exposure station 64 coincides with the center of the CCD detector array. If there is aberration in the optical system, the displacement between the exposure station 64 and the center of the detector array is given by a set of decentering coefficients that is part of the calibration of the frame imaging device 31. The calibration data of the frame imaging device 31 is stored in the firmware A 59. The image pixel (i,j) is associated with the coordinate $(x_i, y_j, z)$ in the coordinate system 240. A series of transformations are carried out that follow the sequence described below.

(a) Rotate the coordinate system 240 around the "y" axis 42 of the image plane 39 to uncouple the pitch angle 48 ($\phi$), a new coordinate system 242 then has its forward axis, i.e. x' axis, aligned parallel to the ground reference plane. The new axes of the coordinate system 242 is referred to as an x' axis, a y' axis and a z' axis. This is shown in FIG. 13A, and the rotational transformation is referred to as "R1".

The coordinate $(x_i', y_j', z')$ in the coordinate system 242 is given by—

$x_i' = x_i \cos \phi - z \sin \phi$ $y_j' = y_j$ $z' = z \cos \phi + x_i \sin \phi.$ (b) Rotate the coordinate system 242 around the "x'" axis to uncouple the roll angle 47 ($\omega$) to effect a new coordinate system 244. The new axes of the coordinate system 244 is referred to as an x" axis, an y" axis, and an z" axis. The azimuthal plane, or the x"-y" plane, of the coordinate system 244 is parallel to the ground reference plane. This is shown in FIG. 13B, and the rotational transformation is referred to as R2. The coordinate $(x_i'', y_j'', z'')$ in the coordinate system 242 is given by—

$x_i'' = x_i'$ $y_j'' = y_j' \cos \omega - z' \sin \omega$ $z'' = z' \cos \omega + y_j' \sin \omega$ (c) The coordinate system 244 is then translated to a reference plane on the ground by a distance equal to the altitude above ground h/cos$\phi$ plus the focal length f, along the "z" axis 43 of the coordinate system 240, to effect a new coordinate system 245. The new axes of the coordinate system 245 is referred to as an x''' axis, a y''' axis, and a z''' axis.

This is shown in FIG. 13C, and the translational transformation is referred to as "T1". The displacement vector of "T1" is obtained by applying the transformation "R1", "R2" in sequence on a vector (0, 0, -f-h/cosφ), or written as—

$$R2[R1[(0, 0, -f-h/\cos \phi)]]$$

(d) FIG. 13D illustrates a non-uniform, anisotropic nature in a tilted imaging geometry. The image scale in coordinate system 245 now becomes non-uniform and anisotropic.

An image scale in the forward axis $M_x$ is the ratio of a distance between an apex center "O" in the principal plane 232 and a point P''' on the ground, to the distance between the apex center "O" in the principal plane 232 and a point P in the image plane 39. The image scale in the forward axis $M_x$ depends on the isotropic image scale M, the pitch angle 48 (φ) and the location of the pixel within the image frame, which is indicated by an angle $\theta_x$. The angle $\theta_x$ is the angle subtended between the vertical axis 44 and the x'''-z''' component of the vector connecting the exposure station and the pixel of interest.

To illustrate a positive magnification scale, the image plane is shown here to lie in between the principal plane 232 and the ground for the purpose of simplicity. The angle $\theta_x$ is given by the arctangent of the distance in the x-component between the point "P" and the exposure station 64 (also the center pixel of the image) to the focal length f. The image scale in the forward direction $M_x$ is given by—

$$M_x = M(1 + \tan \phi \cos \phi (\tan \phi + \sin \theta_x)/(\cos \phi + \theta_x))$$

Similarly the image scale in the y''', or across-track direction $M_y$ is given by—

$$M_y = M(1 + \tan \omega \cos \omega (\tan \omega + \sin \theta_y)/(\cos \omega + \theta_y))$$

(e) The absolute geophysical coordinate on the ground reference plane $(X_i''', Y_j''')$ of an image pixel (i,j), whose azimuthal coordinate in 245 is $(x_i''', y_j''')$, is obtained by integrating the non-uniform image scale $M_x$, $M_y$, times an axial distance in either the "x''''" or "y''''" direction between the pixel of interest (i,j) and the center pixel whose azimuthal coordinate in 245 is $(x_c''', y_c''')$, over an angular range from 0 to $\Theta_{x_i}$ or 0 to $\Theta_{y_j}$, where $\Theta_{x_i}$ and $\Theta_{y_j}$ are the angles subtended in the x-z plane and in the y-z plane from the exposure station 64 to the pixel of interest, namely—

$$X_i''' = x_c''' + (x_i''' - x_c''')(dM_x/d\theta_x)d\theta_x$$

$$Y_j''' = y_c''' + (y_j''' - y_c''')(dM_y/d\theta_y)d\theta_y$$

Thus, the effect of a tilt due to a non-zero roll angle and a non-zero pitch angle is compensated for.

(f) Now the z''' axis of coordinate system 245 is aligned to the vertical axis 44, a coordinate system 247 whose origin coincide with coordinate system 245, but with its forward axis, or "X" axis, in due East, "Y" axis due North is obtained using the drift angle 46 (κ) and an heading of the aircraft ξ. This is shown in FIG. 13E. The azimuthal coordinate $(X_i, Y_j)$ in the coordinate system 247 for the image pixel (i, j) is given by—

$$X_i = X_i''' \cos(\kappa + \xi) - Y_j''' \sin(\kappa + \xi)$$

$$Y_j = Y_j''' \cos(\kappa + \xi) - X_i''' \sin(\kappa + \xi)$$

Thus the absolute geophysical coordinates of any image pixel within an image captured by the frame imaging device 31 is obtained in real-time, and the geometric distortions effected by a non-zero roll angle, a non-zero pitch angle, and a non-zero drift angle are corrected in real-time.

The triggering condition is evaluated by calculating an up-to-date vehicle position and a distance traveled since last exposure. This is compared against a preset distance between successive exposures. When the vehicle has traveled a distance greater than the preset value, a trigger is sent to the memory buffer and camera control 56 to commence the acquisition of a new image.

SYSTEM SHUTDOWN MODULE

The system shutdown module summarizes a number of statistics on the execution of the data acquisition mission, including the number of images that were acquired, the time and place of the acquired images, etc.

Referring to FIG. 14, after an acquisition sequence of "N" exposure is completed, "N" data files are written on the data medium 72. Each data file contains a header section and an image section. The image section contains the image data transferred from the memory buffer and camera control 56. The header section consists of, for example, five (5) subsections, as detailed below.

(a) Firmware Data—These include, for example, a data sync signature, a firmware name, a firmware version, a date of release, a maximum resolution supported, a header format ID.

(b) Hardware Parameters—These include, for example, a camera model, a GPS model, a description of attitude sensor models, a timing synchronizer model, a frame grabber model, a radio link model, a set of dates of service, a pixel dimension.

(c) Mission Parameters—These include, for example, a lens model, a focal length, an F stop, a set of calibration data (including radial and de-centering coefficients), an antenna displacement, a magnetic declination, an exposure duration, an exposure time, a base location, a destination, a time of start, a time of end, a frame count, a flight sequence index, a flight sequence start, a date of mission, a mission status.

(d) GPS and Attitude Data—These include, for example, a count of the GPS position measurement, a count of the number of the attitude data samples, a set of coordinates for a first antenna position, a time of fix, a set of GPS velocity components, a GPS PDOP parameter, a reference datum, a data type, a set of first roll angle and first pitch angle, a time of sample, a first drift measurement. Then follows next set of GPS and attitude data.

(e) Derived Data—These include the geophysical coordinates of current exposure station, the geophysical coordinates of the last exposure station, the geophysical coordinates on the ground corresponding to the center pixel of the current image, the geophysical coordinates on the ground corresponding to the four corners of the current image an endlap or percentage of overlap between successive exposures, units of measure (i.e. Metric, English, etc.).

The apparatus in the preferred embodiment is designed to operate with a small single-engine or twin-engine aircraft at an altitude below three (3 km) kilometers, but it should be readily operable for higher altitudes with pressurized cabin environment. Using commonly available full frame CCD cameras in a 2000×2000 format, and lenses with focal lengths between twenty (20 mm) millimeters to seventy (70 mm) millimeters, terrestrial images of three-tenths (0.3 m) of a meter to one and three-quarters (1.75 m) of a meter GSD can be acquired. Even higher ground resolution is feasible using a helicopter platform.

The accuracy on the derived absolute geophysical coordinate information depends on the accuracy of the position of the aircraft, the accuracy of the attitude parameters of the frame imaging device 31. Current GPS product can provide position information at about less than five (5 m) meters from the true position in real-time for a moving platform, with sub-meter accuracy through post-mission processing. Sub-meter positioning accuracy for determining the absolute geophysical coordinates of a moving platform in real-time is fast-becoming a reality.

Various types of attitude sensing devices are available commercially. Using a leveling type device, the roll angle and the pitch angle accuracy may be measured by one hundredths (0.01) of a degree. An accuracy of a half (0.5) of a degree in the drift angle can be readily obtained. For an image with one (1 m) meter GSD, assuming five (5 m) meter errors in the aircraft position, the accuracy in the derived absolute geophysical coordinate is expected to range from about six (6 m) meters near the image center to about ten (10 m) meters at the edges, and about twelve (12 m) meters at the corners of an image This level of accuracy is obtained using a single frame image, without using any ground control points, or aerial triangulation. The inferior position accuracy at the edges and corners of an image is due to the limitation of the compass type orientation sensing device. Overall, a nominal ten (10 m) meter accuracy in the derived absolute geophysical coordinate information should be readily achievable for images of one (1 m) meter GSD.

While this accuracy of horizontal positioning conforms to the National Map Accuracy Standards at 1:12000 scale, the horizontal positioning accuracy can be improved using kinematic GPS and a "tying-in" processing to reach approximately one to three (1 m to 3 m) meters. Full photogrammetric processing can still be performed on each stereo image pairs to achieve even higher horizontal positioning accuracy, correct for relief displacement, thereby obtaining vertical position information.

FIRMWARE B 70

FIG. 5 shows the process of displaying spatial imagery recorded in a medium and querying the absolute geophysical coordinates of any image features in near-real-time using the contents in the medium. The medium may be a original mission medium, duplicated media, or other secondary medium. The playback and query capability is available using the instrument computer 33, or other computers and workstations.

PROGRAM INIT MODULE

Figure 15:
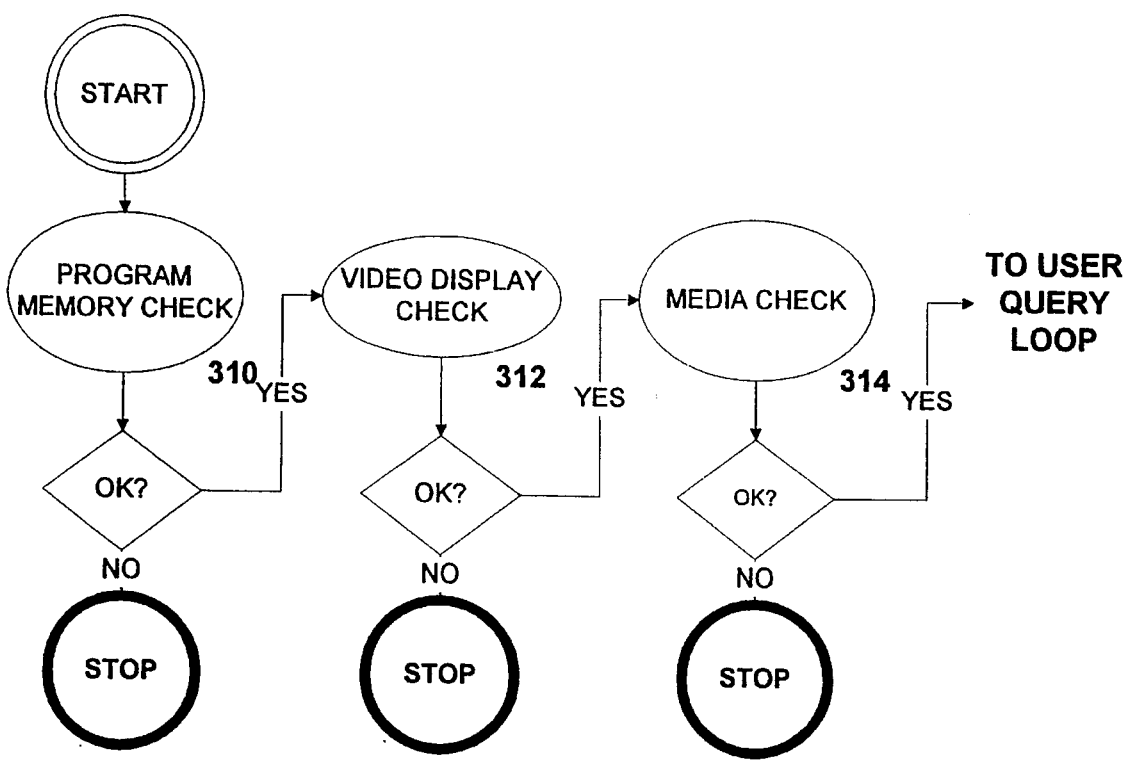
FIG. 15 is an algorithmic, flow chart or schematic diagram of the structure of a program init module of the firmware B.

Referring to FIG. 15, the program init module consists of steps that include: (a) program memory check 310, (b) video display check 312, and (c) media check 314. Step (a) check if enough memory is available, step (b) check if appropriate video display capability is present, step (c) check if a valid data medium is ready for use.

USER QUERY LOOP MODULE

Figure 16:
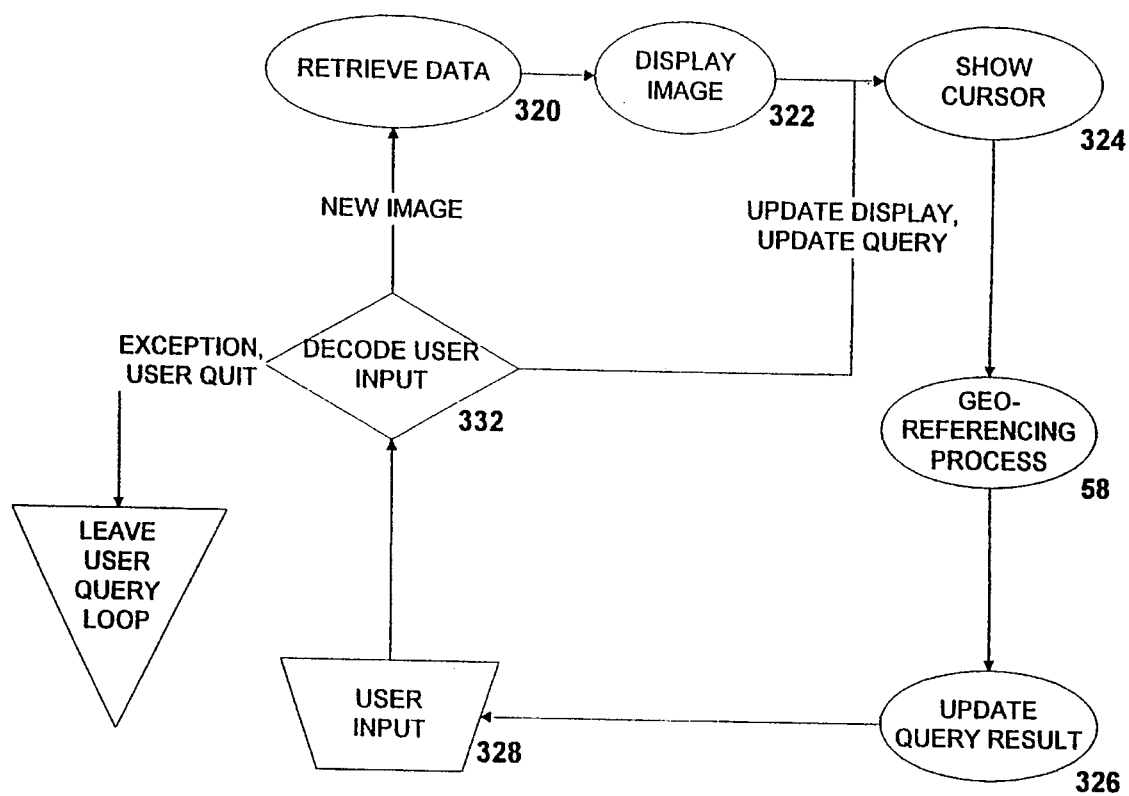
FIG. 16 is an algorithmic, flow chart or schematic diagram of the structure of a user query loop of the firmware B.

Referring to FIG. 16, the user query loop begins with a process 320 that retrieves a file consisting, for example, of the image data, the attitude data, the GPS data and the timing data from the set of data files recorded in the data medium. Next follows a process 322 that puts the image data in a program memory buffer such that the contents of the program memory buffer is displayed as a two dimensional picture of grey scale image. A cursor object 324 in a visual shape that indicates a displayable pixel location is shown on the display console 35. The location of the cursor on the display console is altered by manipulating the input device 36.

The geo-referencing process 58, which is described above in the operations of firmware A 59, is deployed to calculate the absolute geophysical coordinates on the ground reference plane for the image pixel indicated by the cursor 324. The results of the ground coordinates are updated on the display console 35 simultaneously with the image and the moving cursor 324.

Figure 17:
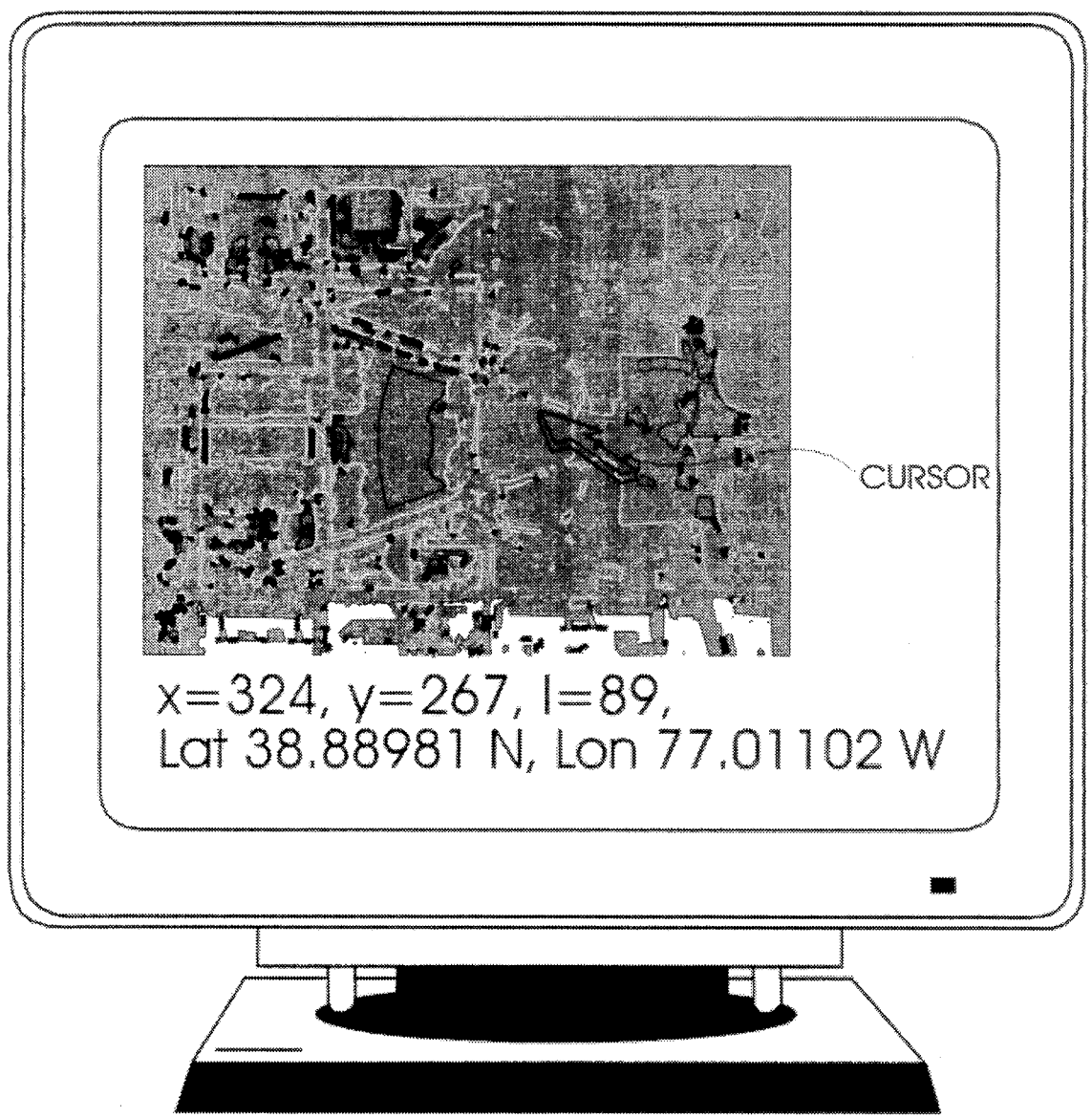
FIG. 17 is a generalized illustration showing a display console displaying an image and querying the absolute geophysical coordinates of ground objects.

This is shown in FIG. 17. A user input stage 328 accepts actions initiated by the user. A process 332 interprets the user's action to (a) retrieve another file of image data, attitude data, GPS data and timing data, (b) position the cursor 324 to a new display location and updates the image display, and (c) leave the user query loop if an exception has occurred or the user quits.

Thus, near real-time image display and spatial querying of the absolute geophysical coordinates of image features are facilitated using the mission instrument, using the original, unprocessed mission medium before the airborne vehicle lands. This provides a first opportunity for the operator to review flight and ground coverage, eliminating the possibility of prolonged mission delays when errors are found out later. The capabilities of near real-time image display and querying of ground coordinates of image features are directly transportable to conventional desktop or portable computers, thereby enabling field survey to immediate access of both mission data and target ground coordinates while conducting surveys in the field at minimum costs.

PROGRAM SHUTDOWN MODULE

When a user inputs an exit request, or an exception had occurred, the program shutdown module relinquishes the control of the instrument computer 33.

ADDITIONAL EMBODIMENTS

Figure 18:
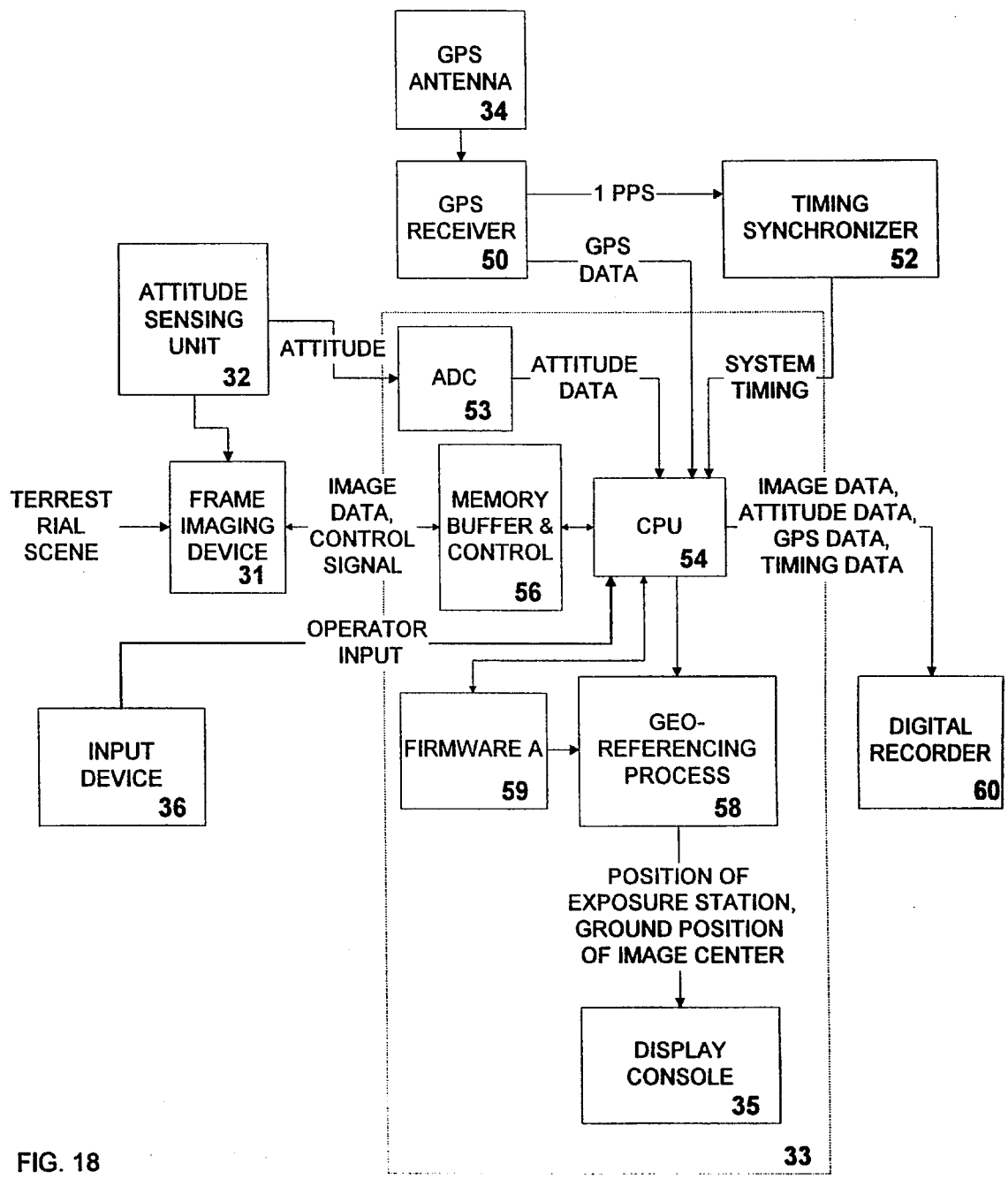
FIG. 18 is a block diagram illustrating an exemplary embodiment of the present invention using different housing method for the instrument computer without a radio link.
Figure 19:
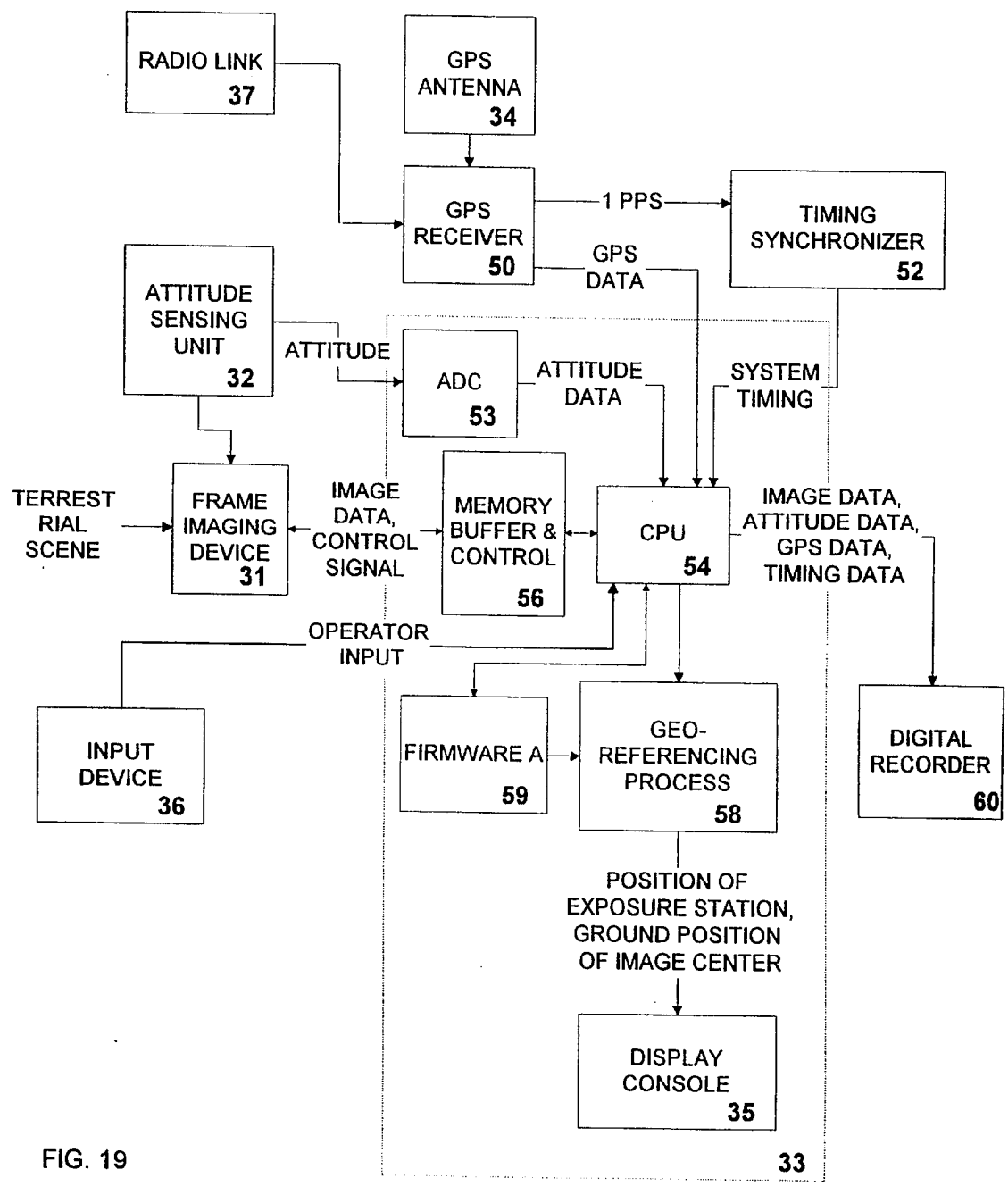
FIG. 19 is a block diagram illustrating yet another different, exemplary embodiment of the present invention with a radio link.

FIGS. 18 & 19 show additional embodiments of the apparatus for acquiring digital maps. Referring to FIG. 18, the instrument computer 33 connects to an external GPS receiver, an external timing synchronizer, and an external digital recorder. The display console 35 is housed inside the instrument computer 33.

The radio link 37 is absent. The error correction provided by the radio link 37 is instead obtained by utilizing off-the-shelf software. In FIG. 19, the radio link 37 is deployed in addition to the arrangement shown in FIG. 18.

The orientation sensor 66 of the attitude sensing unit 32 may be housed in separate entity to measure the angle between the forward axis of the aircraft and the tangent direction of the aircraft trajectory. An angular offset between the forward axis of the aircraft and the forward axis of the frame imaging device is calibrated and stored in firmware A. The orientation sensor 66 may include various type of gyro instruments.

Additional embodiment of the firmware A may include a real-time display of a two dimensional image that were most recently captured. Therefore simultaneous display of terrestrial images and the absolute geophysical coordinate of ground features in the captured images is realized using the instrument computer 33.

SUMMARY, RAMIFICATION, AND SCOPE

The present invention acquires instantaneous pictures of terrestrial objects and a set of ancillary data that provide the absolute geophysical coordinates (Latitude and Longitude) of ground features simultaneously. Any number of series of terrestrial images and absolute geophysical coordinate information are recorded digitally.

The absolute geophysical coordinate information is displayed in real-time. The terrestrial imagery and the absolute geophysical coordinates are displayed and queried in near real-time.

Thus, a digital map consisting of a two-dimensional terrestrial image and the absolute geophysical coordinate of any terrestrial objects in the image are obtained simultaneously from the original mission medium using the instrument computer or other general purpose computers. The geometric distortions due to a tilt or drift angles are accounted for.

From the description of above, a number of advantages of the invention becomes evident:

(a) A two-dimensional, instantaneous image of a terrestrial scene, attitude data of the frame imaging device, position data and velocity data of the vehicle, and timing data are acquired simultaneously, thereby allowing the absolute geophysical coordinates of any image features to be derived without using ground control data.

(b) The absolute geophysical coordinates of terrestrial objects within an image and each exposure station are calculated in real-time, thereby allowing the absolute geophysical coordinates of the four corners of each image to be known in real-time.

(c) The absolute geophysical coordinates of terrestrial objects within an image are calculated without the use of ground control points, thereby reducing the dependence and costs of conducting field survey and shorten the time needed for processing the images to obtain accurate geophysical coordinate information.

(d) The absolute geophysical coordinates of a terrestrial object in an image is calculated such that geometric distortions due to a non-zero roll angle, or a non-zero pitch angle, or a non-zero drift angle is corrected for, thereby reducing the amount of processing to obtain accurate geophysical coordinate information.

(e) The absolute geophysical coordinates of terrestrial objects within an image and each exposure station are displayed in real-time. A knowledge of the exact ground coordinates of the four corners of each image in real-time enables confirmation of successful flight navigation and total coverage of target area in real-time.

(f) The two-dimensional image data, the attitude data of the frame imaging device, the position data and the velocity data of the vehicle, the timing data, and the absolute geophysical coordinates of a number of image features and exposure stations are recorded simultaneously for each exposure, thereby providing portability and accessibility of integrated image data and accurate absolute geophysical coordinate information from mission instrument to desktop computers.

(g) Two-dimensional images are displayed using the mission instrument, the absolute geophysical coordinates of any terrestrial objects within an image are queried using the same mission instrument that acquired the images, resulting in savings in performing quality assurance of data acquisition.

(h) The image display and position querying capabilities are available to the mission instrument, as well as to general purpose computers, thereby lowering the cost of accessing newly acquired image data and accurate absolute geophysical coordinate information of ground objects in the images.

(i) The image display and position querying capabilities are available using the original mission data medium (payload medium), as well as duplicate data media, or secondary media, thereby reducing the delay and cost in accessing both imagery and position information from remotely sensed data for instrument operators, field survey crews, and regular desktop computer users.

It is noted that the exemplary embodiments of the invention described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein generally are to be interpreted as illustrative and not in a limiting sense.

Thus, for example, while the preferred, exemplary embodiment describes a method and an apparatus that acquires panchromatic terrestrial imagery and the absolute geophysical coordinates of terrestrial objects simultaneously, it is within the scope of the present invention to utilize multiple units of frame imaging attached with the attitude sensing devices to acquire real-time stereoscopic imagery, low-oblique imagery, and multispectral imagery with simultaneous absolute geophysical coordinate information.

Thus the scope of the invention should be determined by the appended claims and their legal equivalents, rather than by the specifics of the examples given.

What is claimed is:

1. A method of acquiring at least one instantaneous image of a terrestrial scene from a vehicle moving at a substantial distance above the ground and an associated set of absolute geophysical coordinates of terrestrial objects in said instantaneous picture, comprising the steps of:

a. using a set of devices associated with a frame imaging device to measure at least one set of angles relating an "x" axis, a "y" axis, a "z" axis of an image coordinate system with respect to a set of three world axes that include a forward flight axis, a cross-track axis, and a vertical axis, and tagging them with a first time mark for each set of angles;

b. using a positioning device associated with the moving vehicle to obtain at least one set of absolute geophysical coordinates and velocity of said frame imaging device, and tagging them with a second time mark or each set of coordinates;

c initiating an exposure of said frame imaging device, producing an instantaneous image, and tagging said exposure with a third time mark;

d. collecting said instantaneous image from said frame imaging device, said sets of angles, said sets of absolute geophysical coordinates and velocity, and a set of said time marks; and e. calculating a set of absolute geophysical coordinates of terrestrial objects by means of formulas relating a spatial orientation relationship between said frame imaging device and said terrestrial objects.

2. The method of claim 1, wherein there is further included the step of:

simultaneously recording said instantaneous image and at least one of said sets of angles, said sets of absolute geophysical coordinates and velocity, and a set of said time marks; and said calculated set of absolute geophysical coordinates of terrestrial objects from step "c".

3. The method of claim 1, wherein in step "a" the step of using includes:

positioning said frame imaging device in the moving vehicle to direct it toward said terrestrial scene.

4. The method of claim 1, wherein in step "a" the step of using includes:

attaching said set of devices to said frame imaging devices.

5. The method of claim 1, wherein in step "b" the step of using includes:

attaching said positioning device to said moving vehicle.

6. The method of claim 1, wherein there is further included the step of:

acquiring the terrestrial image and the absolute geophysical coordinates simultaneously.

7. The method of claim 1, wherein there is further included the step of:

displaying the absolute geophysical coordinates of the center of the image and the image boundaries on a console immediately as the image is acquired.

8. The method of claim 1, wherein there is further included the step of:

recording said terrestrial image and said absolute geophysical coordinate information using digital means.

9. The method of claim 8, wherein the step of recording said terrestrial image and said absolute geophysical coordinate information using digital means further includes the step of:

recording said image and said information while said frame imaging device is above the ground and airborne.

10. The method of claim 1, wherein there is further included the step of:

using a CCD camera under computer control as the frame imaging device.

11. The method of claim 1, wherein there is further included the step of:

acquiring the absolute geophysical coordinates of the vehicle using a GPS unit as the position determination device.

12. The method of claim 1, wherein there is further included the step of:

acquiring the attitude information, including the roll angle, the pitch angle, and the drift angle of said frame imaging device at a time related to the time of initiating said exposure.

13. The method of claim 12, wherein there is further included the step of:

acquiring tinning information between the position and attitude determination events and the instant of each exposure.

14. The method of claim 1, wherein there is further included the step of:

calculating in real-time the absolute geophysical coordinates of said frame imaging device, and calculating in real-time in step "c" the absolute geophysical coordinates on a ground reference plane of at least one desired image feature after having corrected the geometric distortions arising from a non-zero roll angle, or a non-zero pitch angle, or a non-zero drift angle.

15. The method of claim 1, wherein there is further included the step of:

displaying said absolute geophysical coordinates of said frame imaging device and the terrestrial objects in the captured image.

16. The method of claim 1, wherein the vehicle is an airborne vehicle and wherein there is further included the step of:

transferring the image data, the airborne vehicle position information, the attitude information of the frame imaging device, and the timing information into a digital recording device located on said vehicle.

17. The method of claim 16, wherein there is further included the step of:

retrieving data from a payload medium from the vehicle for displaying images and querying the absolute geophysical coordinates of images features while airborne or shortly thereafter.

18. The method of claim 16, wherein there is further included the step of:

utilizing a digital recording media which is readily usable in desktop computer use.

19. The method of claim 1, wherein the vehicle is airborne and wherein there is further included the step of:

displaying the absolute geophysical coordinates of some terrestrial features in said image while the vehicle is airborne, with the exact ground coordinate of said features, including the four corners of each image, is displayed in real-time, wherein successful acquisition of the imagery over a target area can be confirmed in real-time.

20. The method of claim 19, wherein there is further included the step of:

displaying said absolute geophysical coordinates of said terrestrial features in said image while the image is being taken.

21. An apparatus for acquiring digital mapping information on an airborne environment comprising:

a. a frame imaging device mounted in a vehicle which moves above the ground a substantial distance;

b. a plurality of angle measuring devices attached to said frame imaging device for measuring a plurality of sets of angular orientations of a set of three world axes, a forward flight axis, a cross-track axis, a vertical axis, with respect to an "x" axis, a "y" axis, a "z" axis of an image coordinate system, and tagged with a first time mark;

c. a positioning device attached to said moving vehicle for obtaining a plurality of sets of absolute geophysical coordinates and velocity of said frame imaging device and tagged with a second time mark;

d. first processor means associated with said frame imaging device for initiating an exposure of said frame imaging device, tagging said exposure with a third time mark, and collecting data from said frame imaging device, said angle measuring devices, and said positioning device, including the set of said time marks; and e. second processor means associated with said first processor means for manipulating said data collected from said frame imaging device, said angle measuring devices, said positioning device, and said set of time marks, in accordance to at least one formula relating a spatial orientation relationship between said frame imaging device and a terrestrial object to obtain a set of absolute geophysical coordinates of said terrestrial object.

22. A method of displaying and querying pictorial images and map information of a plurality of terrestrial objects, comprising the steps of:

a. using a data medium of contents containing at least one instantaneous pictorial images, at least one set of angles relating a spatial orientation relationships of an "x" axis, a "y" axis, and a "z" axis of an image coordinate system positioned at an exposure station, from which said pictorial images(s) were exposed, to a set of three world axes which include a forward flight axis, a cross-track axis and a vertical axis, a plurality of sets of absolute geophysical coordinates and velocity of said exposure stations, a plurality of sets of time marks which distinguish the occurrences of exposures of said pictorial images, measurement of said sets of angles, and measurement of said sets of absolute geophysical coordinates and velocity;

b. using a data medium having recorded data containing said contents of step "a" while said contents were acquired on a vehicle moving above ground;

c. retrieving said recorded data from said data medium of step "b";

d. displaying said pictorial images on a display console as a discrete two dimensional matrix array of pixels of varying brightness;

e. providing a means to indicate a pixel of interest and alter the location of said pixel of interest; and f. applying a set of formulas relating a spatial orientation relationship between said pixel of interest and a terrestrial object in said pictorial images obtaining and displaying a set of absolute geophysical coordinates of a terrestrial object indicated by said pixel of interest.

23. A data acquisition, information display and querying apparatus for acquiring instantaneous pictures of a terrestrial scene and a set of absolute geophysical coordinates of terrestrial objects in said picture simultaneously, displaying said pictures on a display console as a discrete two dimensional matrix array of pixels of varying brightness, querying from said pictures of a terrestrial object at which location a set of absolute geophysical coordinates is of interest, comprising:

a. a frame imaging device mounted in a moving vehicle above the ground;

b. a plurality of angle measuring devices attached to said frame imaging device for measuring a plurality of sets of angular orientations of a set of three world axes, a forward flight axis, a cross-track axis, a vertical axis, with respect to an "x" axis, a "y" axis, a "z" axis of an image coordinate system and tagged with a first time mark;

c. a positioning device attached to said moving vehicle for obtaining a plurality of sets of absolute geophysical coordinates and velocity of said frame imaging device and tagged with a second time mark;

d. first processor means associated with said exposure imaging device for initiating an exposure of said frame imaging device, tagging said exposure with a third time mark, collecting data from said frame imaging device, said angle measuring devices, and said positioning device, as well as the data set of said fist, second and third time marks;

e. second processor means associated with said first processor means for manipulating said data collected from said frame imaging device, said angle measuring devices, said positioning device, and said set of time marks, in accordance to at least one formula relating a spatial orientation relationship between said frame imaging device and a terrestrial object to obtain a set of absolute geophysical coordinates of said terrestrial object;

f. a data medium onto which data from said frame imaging device, said angle measuring devices, said positioning device, and said set of time marks are recorded;

h. third processor means associated with said data medium for retrieving said written data from said data medium, displaying a pictorial image on a display console as a discrete, two dimensional matrix array of pixels of varying brightness, providing a means to indicate a pixel of interest, and providing a means to alter said pixel of interest; and g. fourth processor means associated with and utilizing said second processor means to obtain a set of absolute geophysical coordinates of a terrestrial object indicated by said pixel of interest, and displaying said set of absolute geophysical coordinates of a terrestrial object indicated by said pixel of interest.

* * * * *